="" (12)="" united="" states="" patent<br="">Shanmugam et al.

(10) Patent No.: US 12,384,723 B2
(45) Date of Patent: Aug. 12, 2025

(54) CEMENT SLURRIES, CURED CEMENT AND METHODS OF MAKING AND USE THEREOF

(71) Applicant: Saudi Arabian Oil Company, Dhahran (SA)

(72) Inventors: Sivaprakash Shanmugam, Houston, TX (US); Ashok Santra, Houston, TX (US); Carl Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/591,921

(22) Filed: Feb. 3, 2022

(65) Prior Publication Data

US 2022/0242786 A1 Aug. 4, 2022

Related U.S. Application Data

(60) Provisional application No. 63/145,565, filed on Feb. 4, 2021, provisional application No. 63/145,568, filed on Feb. 4, 2021.

(51) Int. Cl.
*C09K 8/36* (2006.01)
*C04B 24/26* (2006.01)
*C04B 28/02* (2006.01)
*C08F 293/00* (2006.01)
*C04B 103/00* (2006.01)

(52) U.S. Cl.
CPC .......... *C04B 24/2688* (2013.01); *C04B 28/02* (2013.01); *C08F 293/005* (2013.01); *C09K 8/36* (2013.01); *C04B 2103/0051* (2013.01); *C04B 2103/0061* (2013.01); *C04B 2103/0062* (2013.01); *C08F 2438/03* (2013.01); *C08F 2810/20* (2013.01)

(58) Field of Classification Search
CPC ................ C04B 24/2688; C04B 28/02; C04B 2103/0051; C04B 2103/0061; C04B 2103/0062; C04B 24/2641; C04B 2103/0059; C08F 293/005; C08F 2438/03; C08F 2810/20; C09K 8/36; C09K 8/487
See application file for complete search history.

(56) References Cited

U.S. PATENT DOCUMENTS

| 6,715,568 | B1 | 4/2004 | Bailey |
| 10,280,101 | B2 | 5/2019 | Miller et al. |
| 2008/0114128 | A1 | 5/2008 | Destarac et al. |
| 2010/0120637 | A1 | 5/2010 | Bendejacq et al. |
| 2013/0244910 | A1 | 9/2013 | Livanec et al. |
| 2014/0076565 | A1* | 3/2014 | Funkhouser ............. C09K 8/68 |
| | | | 166/305.1 |
| 2014/0374097 | A1* | 12/2014 | Morgan .................. C04B 28/02 |
| | | | 166/293 |
| 2016/0362594 | A1* | 12/2016 | Rojas ...................... C09K 8/46 |
| 2017/0051196 | A1 | 2/2017 | Galindo et al. |
| 2018/0118996 | A1* | 5/2018 | Cadix ................... C09K 8/5083 |
| 2018/0230355 | A1* | 8/2018 | Zha ........................... C09K 8/12 |
| 2019/0106614 | A1 | 4/2019 | Sharma et al. |
| 2019/0185740 | A1 | 6/2019 | Jung et al. |
| 2019/0194397 | A1 | 6/2019 | Jakubowski et al. |
| 2022/0242786 | A1 | 8/2022 | Shanmugam et al. |
| 2022/0243113 | A1 | 8/2022 | Shanmugam et al. |
| 2022/0243114 | A1 | 8/2022 | Shanmugam et al. |

FOREIGN PATENT DOCUMENTS

| CA | 2980510 A1 | 10/2016 |
| WO | 0078891 A1 | 12/2000 |
| WO | 2015049378 A1 | 4/2015 |

OTHER PUBLICATIONS

Tiemeyer (C. Tiemeyer et al., Synthesis, Characterization, and Working Mechanism of a Synthetic High Temperature (200 0C) Fluid Loss Polymer for Oil Well Cementing Containing Allyloxy-2-hydroxy Propane Sulfonic (AHPS) Acid Monomer, Journal of Applied Polymer Science, 2013, 851-860).*
U.S. Office Action dated Aug. 10, 2023 pertaining to U.S. Appl. No. 17/591,880, filed Feb. 3, 2022, pp. 1-28.
Cadix et al., "Diblock Copolymers: A New Class of Fluid Loss Control Additive for Oilfield Cementing", Society of Petroleum Engineers, SPE-173758-MX, 2015.
Cadix et al., "High Temperature Cementing: Fluid Loss Control Polymers Performance and Limitations", Society of Petroleum Engineers, SPE-183129-MS, 2016.
Cadix et al., "Short Term Gas Migration Control in Well Cementing: Comparative Behavior of Fluid Loss Control Polymers", Society of Petroleum Engineers, SPE-184564-MS, 2017.
Goh et al., "Rheology of core cross-linked star polymers", Polymer, vol. 49, pp. 5095-5104, 2008.
Jouenne, "Polymer flooding in high temperature, high salinity conditions: Selection of polymer type and polymer chemistry, thermal stability", Journal of Petroleum Science and Engineering, vol. 195, 107545, 2020.
Liu et al., "Synthesis and characterization of comb-shaped copolymer as a filtration reducer and comparison with counterparts", Royal Society of Chemistry, RSC Advances, vol. 8, pp. 11424-11435, 2018.

(Continued)

*Primary Examiner* — Kumar R Bhushan
(74) *Attorney, Agent, or Firm* — DINSMORE & SHOHL LLP

(57) ABSTRACT

A cement slurry may include an aqueous phase; a cement precursor material; and a hydrophilic branched star polymer. The hydrophilic branched star polymer is a crosslinked, polymerized reaction product of crosslinker C and hydrophilic monomer A and hydrophilic/hydrophobic monomer B and optionally hydrophilic/hydrophobic monomer D. The crosslinked polymerized reaction product includes a plurality of block copolymer segments of hydrophilic monomer A and hydrophilic/hydrophobic monomer B interconnected via crosslinker C; a plurality of block copolymer segments of hydrophilic monomer A, hydrophilic monomer B, and hydrophilic/hydrophobic monomer D interconnected via crosslinker C; or combinations thereof.

10 Claims, 3 Drawing Sheets

(56) References Cited

OTHER PUBLICATIONS

Zhao et al., "Synthesis and evaluation of a novel clean hydraulic fracturing fluid based on star-dendritic polymer", Journal of Natural Gas Science and Engineering, Journal of Natural Gas Science and Engineering, vol. 43, pp. 179-189, 2017.

U.S. Office Action dated Feb. 15, 2023 pertaining to U.S. Appl. No. 17/592,058, filed Feb. 3, 2022, 18 pages.

U.S. Office Action dated Feb. 27, 2023 pertaining to U.S. Appl. No. 17/592,053, filed Feb. 3, 2022, 31 pages.

Carvente et al., "Synthesis of linear and branched hydrophobically associating multiblock copolymers via a one-pot process" Journal of Polymer Research (2002) 27:200 (Year: 2002).

Yuan et al., "Synthesis and properties of high oil-absorbing resin" Huaxue Gongye Yu Gongcheng Jishu vol. 31, Issue: 6, pp. 26-30 (Year: 2010).

Tiemeyer et al., "Systhesis, Characterization, and Working Mechanism of a Synthetic High Temperature (200° C.) Fluid Loss Polymer for Oil Well Cementing Containing Allyloxy-2-hydroxy Propane Sulfonic (AHPS) Acid Monomer" Journal of Applied Polymer Science 2013, 851-8560 (Year: 2013).

Notification of Transmittal of the International Search Report and the Written Opinion of the International Searching Authority, or the Declaration dated May 10, 2022 pertaining to International application No. PCT/US2022/015086 filed Feb. 3, 2022, pp. 1-14.

* cited by examiner

CEMENT SLURRIES, CURED CEMENT AND METHODS OF MAKING AND USE THEREOF

CROSS REFERENCE TO RELATED APPLICATION

This application claims priority to U.S. Provisional Application No. 63/145,565, filed on Feb. 4, 2021, entitled "DRILLING FLUIDS AND METHODS OF MAKING AND USE THEREOF" and U.S. Provisional Application No. 63/145,568, filed on Feb. 4, 2021, entitled "CEMENT SLURRIES, CURED CEMENT AND METHODS OF MAKING AND USE THEREOF," the entire contents of which are incorporated by reference in the present disclosure.

TECHNICAL FIELD

Embodiments of the present disclosure generally relate to cement slurries and methods of making and using cement slurries and to cured cements and methods of making cured cement.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, for well abandonment (sealing an old well to eliminate safety hazards), and many other applications. As cement slurry is placed under pressure across a permeable formation, a filtration process takes place. The aqueous phase of the slurry flows into the formation leaving the cement particle behind. This phenomena, called "fluid loss," can lead to cement failure. The loss of water from the cement slurry lead to increase in density and variation from the original design of the slurry (i.e. rheology, thickening time, mechanical strength once set etc.) and potential bridging or plugging of the annular.

SUMMARY

Oilwell cement slurries require the use of several additives which include dispersing agents, retarders, and fluid loss control additives. Of these components, fluid loss control additives, often including polymers with a molecular weight of greater than 5000 g/mol, prevent water from filtering into the formation during cement placement. To achieve efficient product performance for fluid loss control, the design of the additive has to take into account the adsorption onto cement surface. In addition, conventional fluid loss control additives typically result in reduced adsorption yield at elevated temperatures. To circumvent this inefficiency, cement slurries often increase the loading of the fluid loss control additive polymer to regain acceptable performance. However, increased amounts of polymers with high molecular weight leads to an increase in the viscosity of the cement slurry, which can be managed by adding appropriate dispersant. Cement slurry density can range from 6-22 pounds/gallons.

Accordingly, there is an ongoing need for cement slurries that have decreased fluid loss and with a viscosity of less than 350 cP at 300 RPM (rotations per minute). The present embodiments address these needs by providing cement slurries having amphiphilic branched star polymers, hydrophilic branched star polymers, or both, within the cement slurries.

In one embodiment, a cement slurry is disclosed comprising an aqueous phase, a cement precursor material, and a hydrophilic branched star polymer, wherein the hydrophilic branched star polymer is a crosslinked, polymerized reaction product of crosslinker C and hydrophilic monomer A and hydrophilic monomer B and optionally hydrophilic monomer D, the crosslinked polymerized reaction product comprising: a plurality of block copolymer segments of hydrophilic monomer A and hydrophilic monomer B interconnected via crosslinker C; a plurality of block copolymer segments of hydrophilic monomer A, hydrophilic monomer B, and hydrophilic monomer D interconnected via crosslinker C; or combinations thereof.

In another embodiment, a cement slurry is disclosed comprising an aqueous phase, a cement precursor material, and an amphiphilic branched star polymer, wherein the amphiphilic branched star polymer is a crosslinked, polymerized reaction product of crosslinker C and hydrophilic monomer A and hydrophobic monomer B and optionally hydrophilic monomer D, the crosslinked polymerized reaction product comprising: a plurality of block copolymer segments of hydrophilic monomer A and hydrophobic monomer B interconnected via crosslinker C; a plurality of block copolymer segments of hydrophilic monomer A, hydrophobic monomer B, and hydrophilic monomer D interconnected via crosslinker C; or combinations thereof.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWING

The following detailed description of specific embodiments of the present disclosure can be best understood when read in conjunction with the following drawing, where like structure is indicated with like reference numerals and in which.

DETAILED DESCRIPTION

Figure 1:
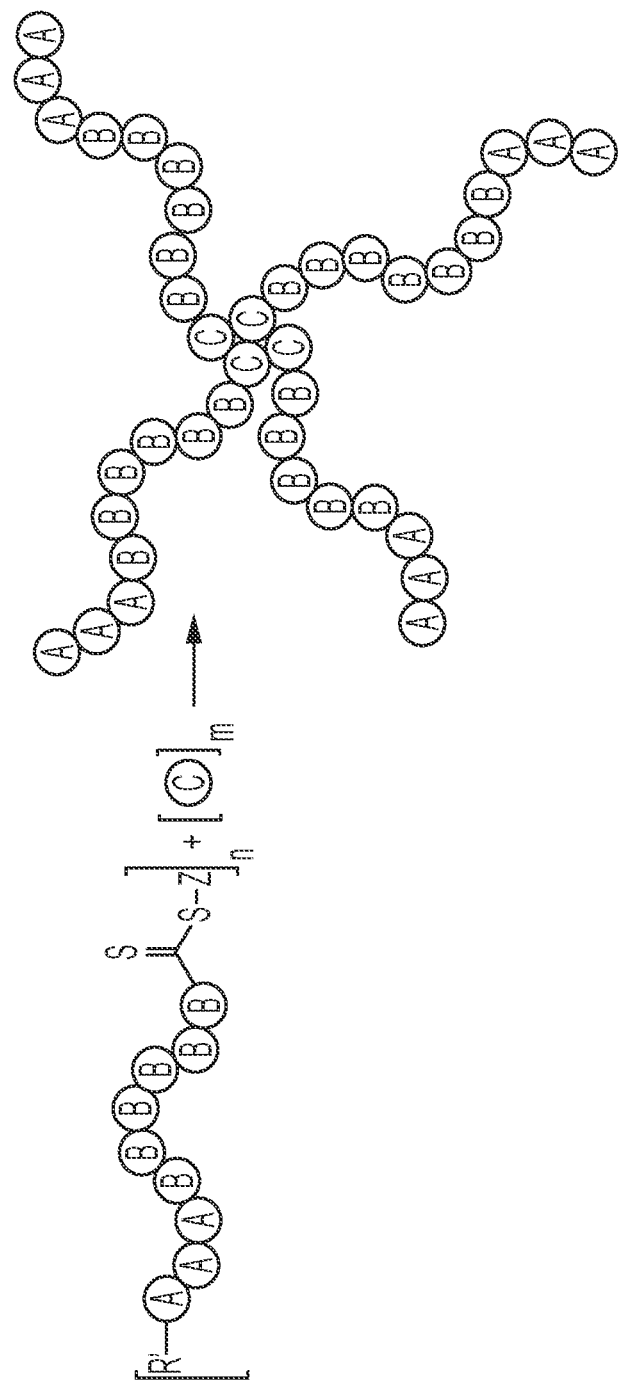
FIG. 1 schematically depicts the synthesis of a hydrophilic branched star polymer, according to one or more embodiments of this disclosure.

As used throughout this disclosure, the term "cement slurry" refers to a composition comprising cement particles that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, "curing" refers to providing adequate moisture, temperature and time to allow the concrete to achieve the desired properties (such as hardness) for its intended use through one or more reactions between the water and the cement particles.

As used throughout this disclosure, "drying" refers to merely allowing the cement to achieve a moisture condition appropriate for its intended use, which may only involve physical state changes, as opposed to chemical reactions.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall, the rock face that bounds the drilled hole.

Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

The present disclosure provides cement slurries which may have, among other attributes, reduced fluid loss and reduced viscosity. The cement slurry may include an aqueous phase; a cement precursor material; and a hydrophilic or amphiphilic branched star polymer.

The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, any known cement precursor material or combinations of any of these.

In some embodiments, the cement slurry may contain from 0.001 to 10% BWOC (by weight of cement), or less than 1% BWOC.

The aqueous phase may be added to the cement precursor material to produce the slurry. The aqueous phase may be any suitable fluid containing, producing, resembling, or having the properties of water. The aqueous phase may include fresh water, salt water, brine, municipal water, formation water, produced water, well water, filtered water, distilled water, sea water, or combinations thereof. The aqueous phase in some embodiments may use water containing organic compounds or salt. Without being bound by any particular theory, salt or organic compounds may be incorporated into the aqueous phase to control the density of the emulsified cement slurry. Increasing the saturation of the aqueous phase by increasing the salt concentration or the level of organic compounds in the aqueous phase may increase the density of the cement slurry. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides or combinations of these. In some particular embodiments, brine may be used in the aqueous phase. Without being bound by any particular theory, brine may be used to create osmotic balance between the cement slurry and the subsurface formation.

In some embodiments, the cement slurry may contain from 10 wt. % to 70 wt. % aqueous phase based on the total weight of the cement slurry. In some embodiments, the cement slurry may contain from 10 wt. % to 40 wt. %, from about 10 wt. % 30 wt. %, 10 wt. % to 20 wt. %, from 20 wt. % to 40 wt. %, or from 20 wt. % to 30 wt. % of the aqueous phase based on the total weight of the cement slurry The cement slurry may contain from 20 wt. % to 40 wt. %, or from 25 wt. % to 35 wt. %, such as 30 wt. % of the aqueous phase based on the total weight of the cement slurry.

The amphiphilic/hydrophilic branched star polymer may be a crosslinked, polymerized reaction product of crosslinker C and hydrophilic monomer A and hydrophilic/hydrophobic monomer B. In embodiments, the amphiphilic/hydrophilic branched star polymer may optionally include hydrophilic/hydrophobic monomer D.

The monomers A, B, and C have the structure:

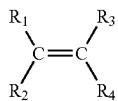

where $R_1$ and $R_2$ may include a halogen, H, CN, $CF_3$, straight or branched alkyl of from 1 to 20 carbon atoms, α,β-unsaturated straight or branched alkenyl or alkynyl of 2 to 10 carbon atoms, α,β-unsaturated straight or branched alkenyl of 2 to 6 carbon atoms substituted with a halogen, $C_3$-$C_8$ cycloalkyl, heterocyclyl C(=Y)$R_5$, C(=Y)$NR_6R_7$ and YC(=Y)$R_8$; where Y may be $NR_8$ or O; $R_5$ is alkyl of from 1 to 20 carbon atoms, alkoxy of from 1 to 20 carbon atoms, aryloxy or heterocyclyloxy; $R_6$ and $R_7$ are independently H or alkyl of from 1 to 20 carbon atoms, or $R_6$ and $R_7$ may be joined together to form an alkylene group of from 2 to 5 carbon atoms, thus forming a 3- to 6-membered ring; and $R_8$ is H, straight or branched $C_1$-$C_{20}$ alkyl or aryl; and $R_3$ and $R_4$ are independently selected from the group consisting of a halogen, H, $C_1$-$C_6$ alkyl and COO$R_9$, where $R_9$ is an alkali metal, H, or a $C_1$-$C_6$ alkyl group; or $R_1$ and $R_3$ may be joined to form a group of the formula $(CH_2)_n$, may be substituted with from 1 to 2n halogen atoms or $C_1$-$C_4$ alkyl groups, and Y is as defined above; and at least two of $R_1$, $R_2$, $R_3$, and $R_4$ are a halogen or H.

Monomer A may include acrylic acid (AA), 2 acrylamido 2 methylpropane sulfonic acid (AMPS), 2 acrylamido ethyl phosphonic acid (AEPA), maleic acid, N,N dimethylacrylamide, (3 acrylamidopropyl)trimethylammonium chloride, 2 hydroxyethyl acrylate, styrene 4 sulfonic acid sodium salt, poly(ethylene glycol) methyl ether acrylate, lauryl acrylate, or combinations thereof. In embodiments, monomer A may include AMPS, AEPA, acrylic acid, maleic acid, or combinations thereof. In embodiments, monomer A may include acrylic acid. The hydrophilic/amphiphilic branched star polymer may include from 5 to 75 wt. %, from 5 to 70 wt. %, from 5 to 60 wt. %, from 5 to 50 wt. %, from 5 to 40 wt. %, from 5 to 30 wt. %, from 5 to 20 wt. %, from 5 to 10 wt. %, from 10 to 75 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 75 wt. %, from 20 to 70 wt. %, from 20 to 60 wt. %, from 20 to 50 wt. %, from 20 to 40 wt. %, from 20 to 30 wt. %, from 30 to 75 wt. %, from 30 to 70 wt. %, from 30 to 60 wt. %, from 30 to 50 wt. %, from 30 to 40 wt. %, from 40 to 75 wt. %, from 40 to 70 wt. %, from 40 to 60 wt. %, from 40 to 50 wt. %, from 50 to 75 wt. %, from 50 to 70 wt. %, from 50 to 60 wt. %, from 60 to 75 wt. %, from 60 to 70 wt. %, or from 70 to 75 wt. % monomer A by weight of the hydrophilic branched star polymer.

Monomer A may include an anionic, hydrophilic monomer including (meth)acrylate monomer units carrying a COOH or COO— group, such as acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, or monoethylenically unsaturated $C_4$-$C_{10}$ (for example, $C_4$ to $C_6$) dicarboxylic acid monoesters (such as monomethyl maleate); monomer ((meth)acrylate/(meth)acrylamide) units carrying phosphate, phosphonate or phosphinate groups (in the free acid form and/or in the saline form), such as 2-acrylamidoethylphosphonic acid (AEPA), monoacryloyloxyethyl phosphate or bis(2-methacryloyloxyethyl) phosphate units, vinylphosphonic acid, allylphosphonic acid, isopropylphosphonic acid, or diallyl aminomethylene phosphonate and their salts; or monomer units comprising a sulfonic acid or sulfonate functional group such as 3-sulfopropyl (meth) acrylate, 2-propene-1-sulfonic acid, sodium 1-allyloxy-2 hydroxypropylsulfonate (COPS1), 2-acrylamido-2-methylpropanesulfonic acid (AMPS), (meth)allyl sulfonate, sodium vinylsulfonate, or sodium styrenesulfonate.

Monomer A may include a nonionic, hydrophilic monomer including monomer units comprising an acrylamide, N,N-(Dimethyl acrylamide) (DMA), (meth)acrylamide, morpholine N-oxide acrylamide, N,N-dimethyl(meth)acrylamide, N,N-diethylacrylamide, (meth) acrylamide, N-isopropyl (meth)acrylamide, N-tert-butyl(meth)acrylamide, or diacetone acrylamide; or (meth)acrylate monomers with ammonium groups, including N,N-dimethylaminomethyl (meth) acrylate, N,N-dimethylaminoethyl (meth) acrylate, N,N-diethylaminoethyl (meth)acrylate, N,N-dimethylaminopropyl (meth) acrylate, N,N-diethylaminopropyl (meth) acrylate and N,N-dimethylaminocyclohexyl (meth)acrylate, meth(acrylamide) monomers with ammonium groups, including N-[2-(dimethylamino) ethyl] (meth)acrylamide, N-[3-(dimethylamino) propyl] (meth)acrylamide, N-[4-(dimethylamino) butyl] (meth)acrylamide, N-[2-(diethylamino) ethyl] (meth)acrylamide, and N-[4-(dimethylamino) cyclohexyl] (meth)acrylamide, [2-((Meth)acryloyloxy) ethyl]trimethylammonium chloride, and zwitterionic monomers such as N-(3-Sulfopropyl)-N-(meth)acroyloxyethyl-N, N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, and N-carboxymethyl-N-methacroyloxyethyl-N,N dimethylammonium betaine. Meth(acrylate) and meth(acrylamide) with alkane diols with $C_2$-$C_{30}$ or polyethylene glycol, such as 2-hydroxyethyl (meth)acrylate, 2-hydroxypropyl (meth)acrylate, 3-hydroxypropyl (meth) acrylate, 3-hydroxybutyl (meth)acrylate, 4-hydroxybutyl (meth)acrylate, 6-hydroxy hexyl (meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris (hydroxymethyl) methacrylamide, 4-acryloylmorpholine, 2-N-morpholinoethyl methacrylate, (meth) acrylate of polyethylene glycol, (meth) acrylate of diethylene glycol, ethylene glycol methyl ether (meth) acrylate, poly (propylene glycol) acrylate, 2-chloroethyl (meth) acrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, or N-vinyl-7-ethyl-2-caprolactam.

Monomer B may include acrylic acid, 2 acrylamido 2 methylpropane sulfonic acid, 2 acrylamido ethyl phosphonic acid, maleic acid, N,N dimethylacrylamide, (3 acrylamidopropyl)trimethylammonium chloride, 2 hydroxyethyl acrylate, styrene 4 sulfonic acid sodium salt, poly(ethylene glycol) methyl ether acrylate, lauryl acrylate, or combinations thereof.

Monomer B may include an anionic, hydrophilic monomer including (meth)acrylate monomer units carrying a COOH or COO— group, such as acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, or monoethylenically unsaturated $C_4$-$C_{10}$ (for example, $C_4$ to $C_6$) dicarboxylic acid monoesters (such as monomethyl maleate); monomer ((meth)acrylate/(meth)acrylamide) units carrying phosphate, phosphonate or phosphinate groups (in the free acid form and/or in the saline form), such as 2-acrylamidoethylphosphonic acid (AEPA), monoacryloyloxyethyl phosphate or bis(2-methacryloyloxyethyl) phosphate units, vinylphosphonic acid, allylphosphonic acid, isopropylphosphonic acid, or diallyl aminomethylene phosphonate and their salts; or monomer units comprising a sulfonic acid or sulfonate functional group such as 3-sulfopropyl (meth)acrylate, 2-propene-1-sulfonic acid, sodium 1-allyloxy-2 hydroxypropylsulfonate (COPS1), 2-acrylamido-2-methyl-propanesulfonic acid (AMPS), (meth)allyl sulfonate, sodium vinylsulfonate, or sodium styrenesulfonate.

Monomer B may include a nonionic, hydrophilic monomer including monomer units comprising an acrylamide, N,N-(Dimethyl acrylamide) (DMA), (meth)acrylamide, morpholine N-oxide acrylamide, N,N-dimethyl(meth)acrylamide, N,N-diethylacrylamide, (meth) acrylamide, N-isopropyl (meth)acrylamide, N-tert-butyl(meth)acrylamide, or diacetone acrylamide; (meth)acrylate monomers with ammonium groups, including N,N-dimethylaminomethyl (meth) acrylate, N,N-dimethylaminoethyl (meth) acrylate, N,N-diethylaminoethyl (meth)acrylate, N,N-dimethylaminopropyl (meth)acrylate, N,N-diethylaminopropyl (meth) acrylate and N,N-dimethylaminocyclohexyl (meth)acrylate, meth(acrylamide) monomers with ammonium groups, including N-[2-(dimethylamino) ethyl] (meth)acrylamide, N-[3-(dimethylamino) propyl] (meth)acrylamide, N-[4-(dimethylamino) butyl] (meth)acrylamide, N-[2-(diethylamino) ethyl] (meth)acrylamide, and N-[4-(dimethylamino) cyclohexyl] (meth)acrylamide, [2-((Meth)acryloyloxy) ethyl]trimethylammonium chloride, and zwitterionic monomers such as N-(3-Sulfopropyl)-N-(meth)acroyloxyethyl-N,N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, and N-carboxymethyl-N-methacroyloxyethyl-N,N dimethylammonium betaine. Meth(acrylate) and meth(acrylamide) with alkane diols with $C_2$-$C_{30}$ or polyethylene glycol, such as 2-hydroxyethyl (meth)acrylate, 2-hydroxypropyl (meth)acrylate, 3-hydroxypropyl (meth) acrylate, 3-hydroxybutyl (meth)acrylate, 4-hydroxybutyl (meth)acrylate, 6-hydroxy hexyl (meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris (hydroxymethyl) methacrylamide, 4-acryloylmorpholine, 2-N-morpholinoethyl methacrylate, (meth) acrylate of polyethylene glycol, (meth) acrylate of diethylene glycol, ethylene glycol methyl ether (meth) acrylate, poly (propylene glycol) acrylate, 2-chloroethyl (meth) acrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, or N-vinyl-7-ethyl-2-caprolactam.

In embodiments, monomer B may include a hydrophobic monomer including a hydrophobic alkyl (meth)acrylate monomer such as $C_2$-$C_{40}$ alkyl esters of acrylic acid and $C_1$-$C_{40}$ alkyl esters of methacrylic acid, vinyl aromatics, and fluorinated alkyl (meth)acrylates. Monomer B may include alkyl (meth)acrylate monomer units with $C_1$-$C_{20}$ alkyl chains such as hydrophobic monomers, can include, without limitation $C_2$-$C_{40}$ alkyl esters of acrylic acid and $C_1$-$C_{40}$ alkyl esters of methacrylic acid (for example methyl (meth) acrylate, ethyl (meth)acrylate, N-propyl (meth)acrylate, isopropyl (meth)acrylate, N-butyl (meth)acrylate, isobutyl (meth)acrylate, tert-butyl (meth)acrylate, pentyl (meth)acrylate, N-hexyl (meth)acrylate, N-heptyl (meth)acrylate, N-octyl (meth)acrylate, 2-ethylhexyl (meth)acrylate, decyl (meth)acrylate, lauryl (meth)acrylate, palmityl (meth)acrylate, stearyl (meth)acrylate, hydrenol (meth)acrylate, behenyl (meth)acrylate, polyisobutene (meth)acrylate, or phenoxyethyl (meth)acrylate), vinyl aromatic units including styrene, phenyl (meth)acrylate, benzyl (meth) acrylate)4-acetoxystyrene, 4-bromostyrene, 2,4-dimethylstyrene, 2,5-dimethylstyrene, 3,5-dimethylstyrene, 4-ethoxystyrene, 4-tert-butystyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, 4-methylstyrene, 2,4,6-trimethylstyrene, or acrylate/methacrylate monomer units with fluorinated functionality.

In embodiments, monomer B may include an alkyl acrylate having the structure shown below.

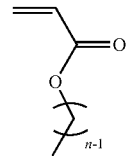

In embodiments, n may range from 5 to 20, from 5 to 17, from 5 to 15, from 5 to 14, from 5 to 12, from 5 to 10, from 5 to 8, from 5 to 7, from 7 to 20, from 7 to 17, from 7 to 15, from 7 to 14, from 7 to 12, from 7 to 10, from 7 to 8, from 8 to 20, from 8 to 17, from 8 to 15, from 8 to 14, from 8 to 12, from 8 to 10, from 10 to 20, from 10 to 17, from 10 to 15, from 10 to 14, from 10 to 12, from 12 to 20, from 12 to 17, from 12 to 15, from 12 to 14, from 14 to 20, from 14 to 17, from 15 to 20, from 15 to 17, or from 17 to 20.

The hydrophilic/amphiphilic branched star polymer may include from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % monomer B by weight of the hydrophilic/amphiphilic branched star polymer.

Monomer D may include any of the monomers described above for either Monomer A or Monomer B.

As stated previously, there are embodiments in which monomer D is not included. In embodiments where monomer D is included, the amphiphilic branched star polymer may include from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % monomer D by weight of the amphiphilic branched star polymer.

The crosslinker C may include vinyl aromatics, (meth)acrylate crosslinkers, (meth)acrylamide crosslinkers, or combinations thereof. The crosslinker C may include N,N methylenebisacrylamide, bis(2-methacryloyl)oxyethyl disulfide, 1,4-bis(4-vinylphenoxy)butane, divinyl benzene, ethylene glycol di(meth)acrylate, diethylene glycol di(meth)acrylate, tetra(ethylene glycol) diacrylate, triethylene glycol dimethacrylate, poly(ethylene glycol) di(meth)acrylate, neopentyl glycol diacrylate, neopentyl glycol propoxylate diacrylate, tri(propylene glycol) diacrylate, or combinations thereof. In embodiments, crosslinker C may include N,N methylene bis(acrylamide). The hydrophilic branched star polymer may include from 15 to 30 wt. %, from 15 to 25 wt. %, from 15 to 20 wt. %, from 20 to 30 wt. %, from 20 to 25 wt. %, or from 25 to 30 wt. % crosslinker C by weight of the hydrophilic branched star polymer.

Figure 2:
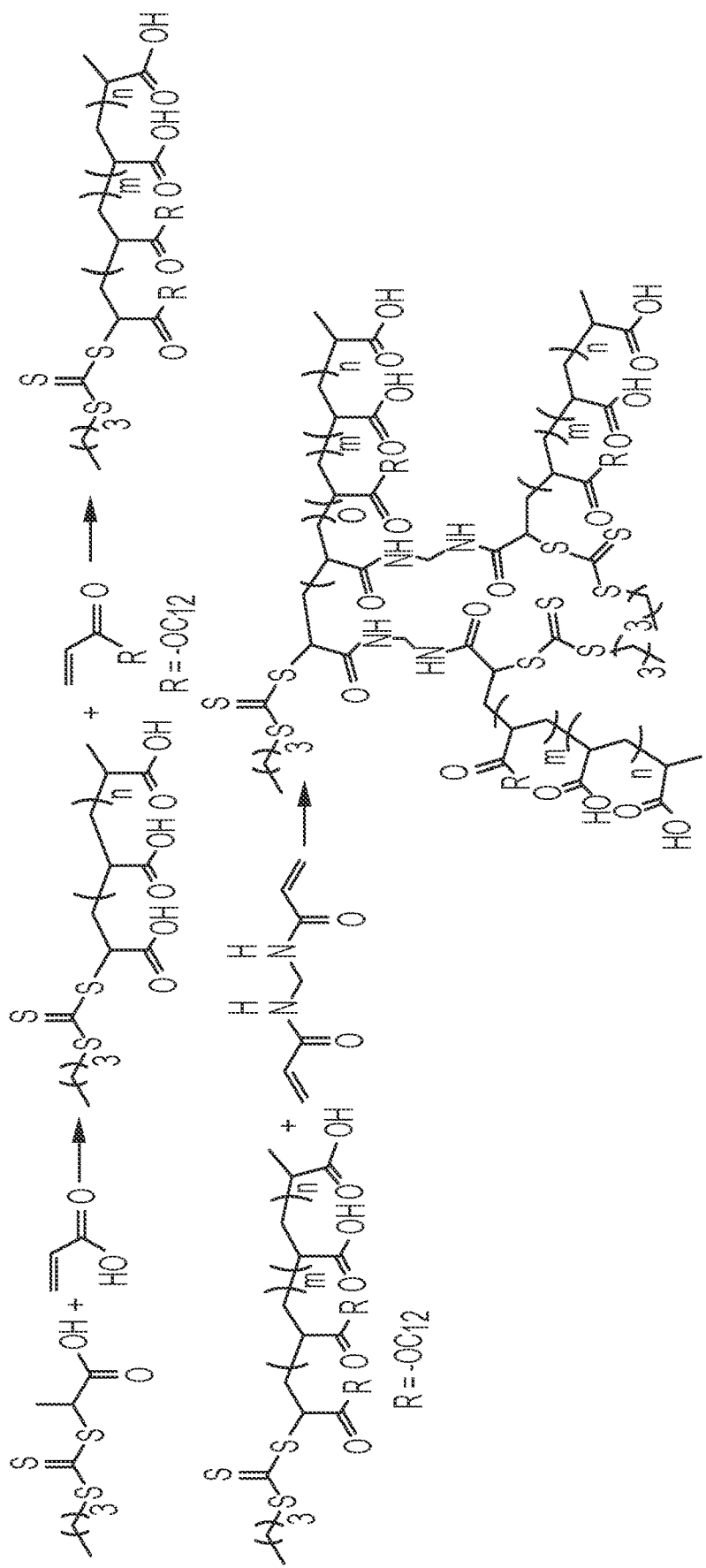
FIG. 2 schematically depicts the synthesis of an amphiphilic branched star polymer, according to one or more embodiments of this disclosure.

The polymerized reaction product may include a plurality of block copolymer segments of hydrophilic monomer A and hydrophilic/hydrophobic monomer B interconnected via crosslinker C, as shown in FIGS. 1 and 2. In other embodiments, the polymerized reaction product may include a plurality of block copolymer segments of hydrophilic monomer A, hydrophilic/hydrophobic monomer B, and hydrophilic/hydrophobic monomer D interconnected via crosslinker C (not shown). In yet another embodiment, the polymerized reaction product may include both a plurality of block copolymer segments of hydrophilic monomer A and hydrophilic/hydrophobic monomer B interconnected via crosslinker C and a plurality of block copolymer segments of hydrophilic monomer A, hydrophilic/hydrophobic monomer B, and hydrophilic/hydrophobic monomer D interconnected via crosslinker C (not shown).

The synthesis of the hydrophilic branched star polymer may include reversible addition-fragmentation chain transfer (RAFT) polymerization. RAFT polymerization requires the use of (I) initiators, (II) RAFT agents, and (III) monomers (for instance the monomers A, B C, and D previously described).

The initiators begin the polymerization reactions and may include hydrogen peroxides, azo compounds, redox systems, alkali metals, ammonium persulfates, ammonium perborates, ammonium perchlorates, alkali metal persulfates, or combinations thereof. The redox systems may include hydrogen peroxide, alkyl peroxide, alkyl peresters, alkyl percarbonates, iron salt, titanous salt, zinc formaldehyde sulfoxylate or sodium formaldehyde sulfoxylate, or combinations thereof. In embodiments, the alkali metals, ammonium persulfates, ammonium perborates, or ammonium perchlorates may be used in combination with an alkali metal bisulfite, reducing sugars, or both. The alkali metal bisulfite may include sodium metabisulfite. In embodiments, the alkali metal persulfates may be used in combinations with an arylphosphinic acid, reducing sugars, or both. The arylphosphinic acid may include benzenephosphonic acid.

The hydrogen peroxides may include tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, or combinations thereof.

An azo compound is a compound bearing the functional group diazenyl R—N=N—R', in which R and R' can be either aryl or alkyl. The azo compounds may include 4,4'-Azobis(4-cyanovaleic acid), 2,2'-Azobis(2-methylpropionitrile), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]-propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2 '-azobis(2-methyl-N-[1,1-bis(hydroxy-methyl)-2-hydroxyethyl]propionamide), 2,2'-azobis(2-methyl-N-[1,1-bis(hydroxy-methyl)ethyl] propionamide), 2,2'-azobis[2-methyl-N-(2-hydroxyethyl) propionamide], 2,2'-azobis(isobutyramide) dehydrate, or combinations thereof. In embodiments, the initiator may include 4,4'-azobis(4-cyanovaleic acid), 2,2'-azobis(2-methylpropionitrile), or both. The chemical structure of 4,4'-azobis(4-cyanovaleic acid) and 2,2'-azobis(2-methylpropionitrile) are shown below:

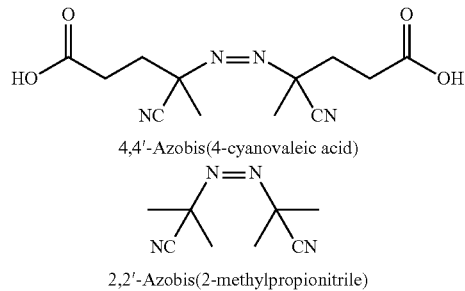

4,4'-Azobis(4-cyanovaleic acid)

2,2'-Azobis(2-methylpropionitrile)

The initiators may have an initiation temperature of from 50° C. to 80° C., from 50° C. to 75° C., from 50° C. to 70° C., from 50° C. to 65° C., from 50° C. to 60° C., from 50° C. to 55° C., from 55° C. to 80° C., from 55° C. to 75° C., from 55° C. to 70° C., from 55° C. to 65° C., from 55° C. to 60° C., from 60° C. to 80° C., from 60° C. to 75° C., from 60° C. to 70° C., from 60° C. to 65° C., from 65° C. to 80° C., from 65° C. to 75° C., from 65° C. to 70° C., from 70° C. to 80° C., from 70° C. to 75° C., or from 75° C. to 80° C. Without intending to be bound by theory, it may be desirable to have the initiation temperature be less than 100° C., less than 90° C., less than 85° C., less than 80° C., less than 75° C., less than 70° C., or less than 65° C. in order to be lower than a boiling temperature of the solvent.

The general structure of a RAFT agent is:

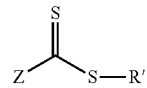

where Z referents a hydrogen atom, a chlorine atom, a sulfur atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acycloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' represents an optionally substituted alkyl, acyl, aryl, aralkyl, alkenyl or alkynyl group; a saturated or unsaturated, aromatic, optionally substituted carbocycle or heterocycle; or a polymer chain, where the polymer chain may be hydrophilic.

The R' or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl C$_n$F$_{2n+1}$, allyl, epoxy, alkoxy (—OR), S-alkyl, S-aryl, Se-alkyl, Se-aryl groups exhibiting a hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The RAFT agents may include sulfur, nitrogen, oxygen, selenium, phosphorus, or combinations thereof. In embodiments, the RAFT agent may include sulfur and one or more of the group consisting of nitrogen, oxygen, selenium, and phosphorus. Without intending to be bound by theory, the RAFT agents include sulfur to ensure chemical stability at temperatures greater than or equal to 100° C., greater than or equal to 120° C., greater than or equal to 140° C., or greater than or equal to 150° C.

In embodiments, the structure of the RAFT agent may be:

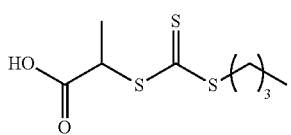

RAFT polymerization may occur as illustrated below:

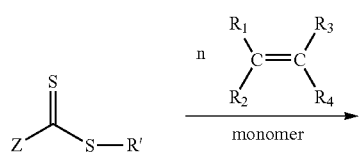

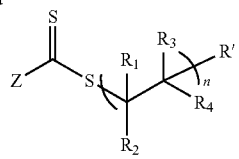

In embodiments, the RAFT polymerization may include 2 steps. The first step may be the initiation of the polymerization reaction, as shown below:

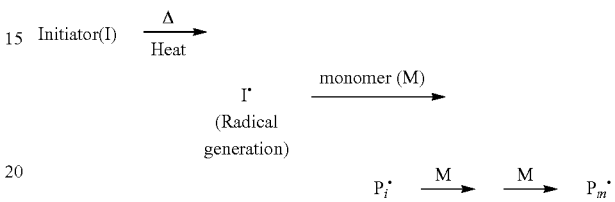

The second step may be the chain transfer reaction between radicals and the RAFT agent as shown below:

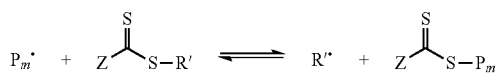

The hydrophilic branched star polymer may have a number averaged molecular weight of greater than 3000 grams per mole (g/mol), greater than 5000 g/mol, greater than 7500 g/mol, greater than 10,000 g/mol, greater than 50,000 g/mol, greater than 100,000 g/mol, greater than 300,000 g/mol, greater than 500,000 g/mol, greater than 1,000,000 g/mol, greater than 5,000,000 g/mol, or greater than 10,000,000 g/mol.

The cement slurry may include from 0.05 to 10 wt. %, from 0.05 to 8 wt. %, from 0.05 to 6 wt. %, from 0.05 to 5 wt. %, from 0.05 to 4 wt. %, from 0.05 to 2 wt. %, from 0.05 to 1 wt. %, from 0.05 to 0.5 wt. %, from 0.05 to 0.3 wt. %, from 0.05 to 0.2 wt. %, from 0.05 to 0.1 wt. %, from 0.1 to 10 wt. %, from 0.1 to 8 wt. %, from 0.1 to 6 wt. %, from 0.1 to 5 wt. %, from 0.1 to 4 wt. %, from 0.1 to 2 wt. %, from 0.1 to 1 wt. %, from 0.1 to 0.5 wt. %, from 0.1 to 0.3 wt. %, from 0.1 to 0.2 wt. %, from 0.2 to 10 wt. %, from 0.2 to 8 wt. %, from 0.2 to 6 wt. %, from 0.2 to 5 wt. %, from 0.2 to 4 wt. %, from 0.2 to 2 wt. %, from 0.2 to 1 wt. %, from 0.2 to 0.5 wt. %, from 0.2 to 0.3 wt. %, from 0.2 to 0.2 wt. %, from 0.3 to 10 wt. %, from 0.3 to 8 wt. %, from 0.3 to 6 wt. %, from 0.3 to 5 wt. %, from 0.3 to 4 wt. %, from 0.3 to 2 wt. %, from 0.3 to 1 wt. %, from 0.3 to 0.5 wt. %, from 0.5 to 10 wt. %, from 0.5 to 8 wt. %, from 0.5 to 6 wt. %, from 0.5 to 5 wt. %, from 0.5 to 4 wt. %, from 0.5 to 2 wt. %, from 0.5 to 1 wt. %, from 1 to 10 wt. %, from 1 to 8 wt. %, from 1 to 6 wt. %, from 1 to 5 wt. %, from 1 to 4 wt. %, from 1 to 2 wt. %, from 2 to 10 wt. %, from 2 to 8 wt. %, from 2 to 6 wt. %, from 2 to 5 wt. %, from 2 to 4 wt. %, from 4 to 10 wt. %, from 4 to 8 wt. %, from 4 to 6 wt. %, from 4 to 5 wt. %, from 5 to 10 wt. %, from 5 to 8 wt. %, from 5 to 6 wt. %, from 6 to 10 wt. %, from 6 to 8 wt. %, from 8 to 10 wt. % hydrophilic/amphiphilic branched star polymer based on the total weight of the cement slurry. It is contemplated that if the cement slurry included greater than 10 wt. % of the hydrophilic/amphiphilic branched star polymer based on the total weight of the cement slurry that the hydrophilic/amphiphilic branched star polymer would not mix well into the cement slurry.

The cement slurry may further include at least one of a surfactant or a dispersing agent. The surfactant may include at least one of anionic surfactants, cationic surfactants, amphoteric surfactants, zwitterionic surfactants, nonionic surfactants, or combinations thereof. In some embodiments, the dispersing agent comprises polycarboxylate ether, sulfonated naphthalene formaldehyde condensate, sulfonated acetone formaldehyde condensate, sulfonated polymers, polystyrene sulfonate, malemide, or combinations of these. Sulfonated polymers may include aliphatic sulfonated polymers, aromatic sulfonated polymers, heteroaromatic sulfonated polymers, and combinations of these. In some embodiments, the dispersing agent may contain one or more anionic groups. For instance, the dispersing agent may include synthetic sulfonated polymers, lignosulfonates with carboxylate groups, organic acids, hydroxylated sugars, or combinations of any of these. Without being bound by any particular theory, in some embodiments, the anionic groups on the dispersing agent may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of: reduction of friction pressure when pumping; reduction of water content; and improvement of the performance of fluid loss additives.

In some embodiments, the cement slurry may include at least one additive other than the branched star polymer. The one or more additives may be any additives known to be suitable for cement slurries. As non-limiting examples, suitable additives may include accelerators, retarders, extenders, weighting agents, fluid loss control agents, lost circulation control agents, surfactants, antifoaming agents, and combinations of these.

In some embodiments, the cement slurry may contain from 0.1 to 10% BWOC of the one or more additives based on the total weight of the cement slurry. For instance, the cement slurry may contain from 0.1 to 8% BWOC of the one or more additives, from 0.1 to 5% BWOC of the one or more additives, or from 0.1 to 3% BWOC of the one or more additives. The cement slurry may contain from 1 to 10% BWOC of the one or more additives, from 1 to 8% BWOC, from 1 to 5% BWOC, or from 1 to 3% BWOC of the one or more additives. In some embodiments, the cement slurry may contain from 3 to 5% BWOC, from 3 to 8% BWOC, from 3 to 10% BWOC, or from 5 to 10% BWOC of the one or more additives.

Embodiments of the disclosure also relate to methods of producing the cement slurry and methods of curing the cement slurry, including any embodiment of the cement slurry previously described.

The method of producing the cement slurry may include mixing the aqueous phase, the cement precursor material, and the branched star polymer. The aqueous phase, the cement precursor material, and the branched star polymer may be in accordance with any of the embodiments previously described.

The mixing step, in some embodiments, may involve shearing at least one of the water, nanomaterial particles, cement particles, and cement additive particles, and, optionally, other additives to form the cement slurry. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \quad \text{EQUATION 1}$$

where $E$ = Mixing energy (kJ)

$M$ = Masss of slurry (kg)

$k = 6.1 \times 10^{-8} \text{m}^5/\text{s}$ (constant found experimentally)

$\omega$ = Rotational speed(radians/s)

$t$ = Mixing time(s)

$V$ = Slurry volume(m$^3$)

The method may further include adding at least one of a dispersing agent or a surfactant to the cement slurry prior to adding the nanomaterial particles to the cement slurry. In other embodiments the method may further include adding at least one of a dispersing agent or a surfactant to the cement slurry after adding the nanomaterial particles to the cement slurry. In some embodiments, the dispersing agent comprises polycarboxylate ether, sulfonated naphthalene formaldehyde condensate, sulfonated acetone formaldehyde condensate, sulfonated polymers, polystyrene sulfonate, malemide, or combinations of these. Sulfonated polymers may include aliphatic sulfonated polymers, aromatic sulfonated polymers, heteroaromatic sulfonated polymers, and combinations of these. In some embodiments, the dispersing agent may contain one or more anionic groups. For instance, the dispersing agent may include synthetic sulfonated polymers, lignosulfonates with carboxylate groups, organic acids, hydroxylated sugars, or combinations of any of these. Without being bound by any particular theory, in some embodiments, the anionic groups on the dispersing agent may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of: reduction of friction pressure when pumping; reduction of water content; and improvement of the performance of fluid loss additives.

The surfactant may include at least one of anionic surfactants, cationic surfactants, amphoteric surfactants, zwitterionic surfactants, nonionic surfactants, or combinations thereof. The method may further include adding one or more of any additive previously described.

In some embodiments, the method may further include adding at least one additive other than the hydrophilic branched star polymer to the cement slurry after adding the hydrophilic branched star polymer to the cement slurry. In other embodiments, the method may further include adding at least one additive other than the hydrophilic branched star polymer to the cement slurry prior to adding the hydrophilic branched star polymer to the cement slurry. The one or more additives may include any of the additives previously described.

This disclosure further includes methods of curing the cement slurry to form cured cement. In some embodiments, curing the cement slurry may refer to passively allowing time to pass under suitable conditions upon which the cement slurry may harden or cure through allowing one or more reactions between the water and the cement particles. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement particles, or a combination of these. Usually, the cement will be cured and convert from liquid to solid due to subsurface formation conditions, temperature, and pressure. In the laboratory, a curing chamber capable of applying temperature and pressure is used for curing the cement specimens at required conditions. Cylindrical molds (2" diameter and 5" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 psi, greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

In one embodiment, the silicates phase in the cured cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolves releasing calcium and sulphate ions to react with the aluminate and hydroxyl ions produced by the C3A to form a calcium trisulphoaluminate hydrate, known as the mineral ettringite ($Ca_6Al_2(SO_4)_3(OH)_{12}\cdot 26H_2O$) that will precipitate onto the $Ca_3O_5Si$ surfaces preventing further rapid hydration (flash-set). The gypsum is gradually consumed and ettringite continues to precipitate until all the gypsum is consumed. The sulphates ion concentration will reduce and the ettringite will become unstable converting to calcium monosulphoaluminate hydrate ($Ca_4Al_2O_6(SO_4)\cdot 14H_2O$). The remaining unhydrated $Ca_3O_5Si$ will form calcium aluminate hydrate. Cement slurry design is based on the altering or inhibition of the hydration reactions with specific additives.

Further embodiments of the present disclosure relate to methods of using the cement slurries previously described. In some embodiments, the method may include pumping the cement slurry into a location to be cemented and curing the cement slurry by allowing the water and the cement particles to react. The location to be cemented may, for instance, be a well, a wellbore, or an annulus.

Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there, the cement slurry fills in the space between the casing and the wellbore, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the open hole. Additionally, the required physical properties of the cement are essential before commencing cementing operations. The proper set cement is also determined, including the density and viscosity of the material, before actually pumping the cement into the hole.

Further embodiments of the present disclosure relate to particular methods of cementing a casing in a wellbore. The method may include pumping the cement slurry into an annulus between a casing and a wellbore and curing the cement slurry. The cement slurry may be in accordance with any of the embodiments previously described. Likewise, curing the cement slurry may be in accordance with any of the embodiments previously described. As stated previously, cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

In some embodiments, the cement slurry may contain water and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

EXAMPLES

As mentioned, the drilling fluid of the present disclosure may have improved characteristics over conventional drilling fluids, for instance, reduced coefficient of friction, pumpability and hole-cleaning capability, among other characteristics. These attributes will be demonstrated by the Examples that follow.

To demonstrate the improved fluid loss characteristics of the present embodiments, drilling fluids were formulated in accordance with the present disclosure and tested in comparison to drilling fluids with conventional fluid loss control additives.

Example 1

Two branched star polymers were synthesized. Amphiphilic branched star copolymer SP-01 was synthesized using acrylic acid (monomer A) and lauryl acrylate (monomer B).

The procedure for synthesizing branched star polymers for oil-based drilling fluids is described below.

The apparatuses used for the procedure included two round bottom flasks: 50 mL & 250 mL were used, along with a thermocouple, a rubber septum, long and short needles, pipettes, electrical tape, a stirrer bar, astirrer bar picker, and a thermal hot plate (a RT2 Advanced Hotplate Stirrer, available from Thermo Scientific).

The materials used for the procedure included acrylic acid (AA), polyacrylic acid (PAA), poly(acrylic acid)-block-poly (lauryl acrylate) (PAA-b-PLA), 2-(Butylthiocarbonothioyl-thio)propanoic acid (BTPA), 4,4'-Azobis(4-cyanovaleric acid) (ACPA), 2,2'-Azobis(2-methylpropionitrile)(AIBN), tetrahydrofuran (THF), methylene bisacrylamide (MBA), benzoyl peroxide (BPO), toluene, and isopropanol.

The materials used in synthesizing PAA are described in Table 1 below:

TABLE 1

Formulation for the synthesis of PAA.

| Materials | No. of Moles | Mass(g) | Volume (mL) | | |
|---|---|---|---|---|---|
| AA | 0.028032195 | 2.02 | 1.921979068 | Monomer concentration | 4.657691939 |
| BTPA | 0.001868813 | 0.445506337 | | Total volume | 6.018473476 |
| Water | N/A | N/A | 3 | Total mass | 2.520504383 |
| ACPA | 0.000196225 | 0.054998046 | | | |
| Ethanol | 0.014161865 | 1.035090721 | 1.096494408 | | |

The chemicals listed in Table 1 were placed in a 50 mL round bottom flask with a stirrer bar. The initial synthesis of PAA was then carried out. The reaction vessel was sealed with a septum and secured with electrical tape. The reaction vessel was then purged under nitrogen for 20-30 mins. The reaction was then carried out for 3 hours at 70° C. in a thermal bath while stirring. The reaction was stopped by cooling under room temperature followed by placing the reaction vessel in an ice bath. The reaction mixture was then dried overnight in a vacuum oven at 50° C. or under continuous air blowing to remove any solvent.

The materials used in synthesizing the block copolymer of PAA-block-PLA are described in Table 2 below:

TABLE 2

Formulation for the synthesis of block copolymer of PAA-block-PLA.

| Materials | No. of moles | Mass(g) | Volume (mL) | | |
|---|---|---|---|---|---|
| PAA | 0.001910501 | 2.520504383 | | Monomer concentration | 1.111073219 |
| Lauryl Acrylate | 0.047762516 | 11.48115357 | 12.98773028 | Total volume | 42.98773028 |
| AIBN | 0.00019105 | 0.031372331 | | Total mass | 14.03303028 |
| THF | | | 30 | | |

THF was then added to the dried reaction mixture and stirred with a stirrer bar to dissolve the dried solid. The remaining materials from Table 2 were then added to the flask and stirred until complete homogenization is achieved. The flask was sealed with a septum and secured with electrical tape. The reaction was then purged under nitrogen for 30 minutes. The reaction was then carried out for 18 hours at 60° C. in a thermal bath while stirring. The reaction was stopped by cooling under room temperature followed by placing the reaction vessel in an ice bath.

The materials used in synthesizing the star polymer of PAA-block-PLA are described in Table 3 below:

TABLE 3

Formulation for the synthesis of star polymer of PAA-block-PLA.

| Materials | No. of moles | Mass(g) | Volume (mL) | | |
|---|---|---|---|---|---|
| PAA-b-PLA | 0.001914781 | 14.03303028 | 42.98773028 | Polymer concentration | 0.010350856 |
| Methylene biscarylamide | 0.019147813 | 2.95201838 | | Total volume | 184.9877303 |
| AIBN | 0.000191478 | 0.031442624 | | Total mass | 17.01649129 |
| THF | | | 142 | | |

After placing the reaction vessel in the ice bath, the reaction mixture was then transferred to a 250 mL round bottom flask. The materials from Table 3 were then added to the 250 mL round bottom flask and stirred. Complete homogenization was not achieved because methylene bisacrylamide has limited solubility in THF at room temperature. The flask was then sealed with a septum and secured with electrical tape. The reaction mixture was purged under nitrogen for 30 minutes. The reaction was carried out for 8 hours at 60° C. in a thermal bath while stirring. The reaction was stopped by cooling under room temperature followed by placing the reaction vessel in an ice bath. The reaction mixture was dried overnight in a vacuum oven at 50° C. or under continuous air blowing to remove any solvent. The dried material had a strong garlic odor, and therefore, needed to be processed chemically to remove the odor. This process involved the removal of the sulphur groups on the polymer (also referred to as "desulfurization").

The materials used in synthesizing the star polymer of PAA-block-PLA are described in Table 4 below:

TABLE 4

Formulation for the odor removal of star block copolymer of PAA-block-PLA.

| Star Polymer | Benzoyl peroxide | Toluene | Isopropanol |
|---|---|---|---|
| 5 g | 0.47 g | 30 mL | 30 mL |

The materials listed in Table 4 are then added to a 250 mL round bottomed flask. The flask is sealed with a septum and secured with electrical tape. The septum was tightly fastened to the flask to avoid the septum popping off upon heating. The mixture was then purged with nitrogen for 30 minutes. The reaction was carried out at 100° C. for 2 hours. The reaction was stopped by cooling under room temperature followed by placing the reaction vessel in an ice bath. The reaction mixture was dried under continuous air blowing to remove any solvent. Purification of the star polymer was then carried out by dissolving the reaction mixture in a minimum amount of THF followed by precipitation in methanol and then precipitation in water followed by vacuum filtration.

RAFT polymerization was used to initially polymerize a short segment of acrylic acid. Lauryl acrylate was then added again to enable synthesis of block copolymer poly(acrylic acid)-block-poly(lauryl acrylate). The synthesized block copolymer was then crosslinked with methylene bisacrylamide (monomer C) to form SP-01. The reaction mechanism is shown in FIG. 2. Based on thermogravimetric analysis, SP-01 began degrading at approximately 400° C. The hydrodynamic diameter of SP-01 was determined via dynamic light scattering to be approximately 17 nm.

Additionally, the polydispersity index (PDI) of SP-01 was determined via dynamic light scattering to be approximately 11.6%. The dynamic light scattering was conducted with the Litesizer 500 (available from Anton Paar). The PDI was calculated by the Litesizer 500 software The PDI of particles is a representation of size distribution of particles. Based on the PDI of the particle measured, rough estimations of the particle distributions can be made. For example, a PDI of 0% may indicate that the particles are monodispersed and uniform, a PDI of 0-10% may indicate that the particles are monodispersed and narrow, a PDI of 10-40% may indicate that the particles are polydispersed and moderate, and a PDI of greater than 40% may indicate that the particles are polydispersed and broad. The polymeric nanoparticles may polydisperse in nature due to polymeric chains of different lengths. The Examples in this disclosure indicate that polydispersed nanoparticles in the narrow to moderate range with small hydrodynamic diameters provide the lowest fluid loss control.

Figure 3:
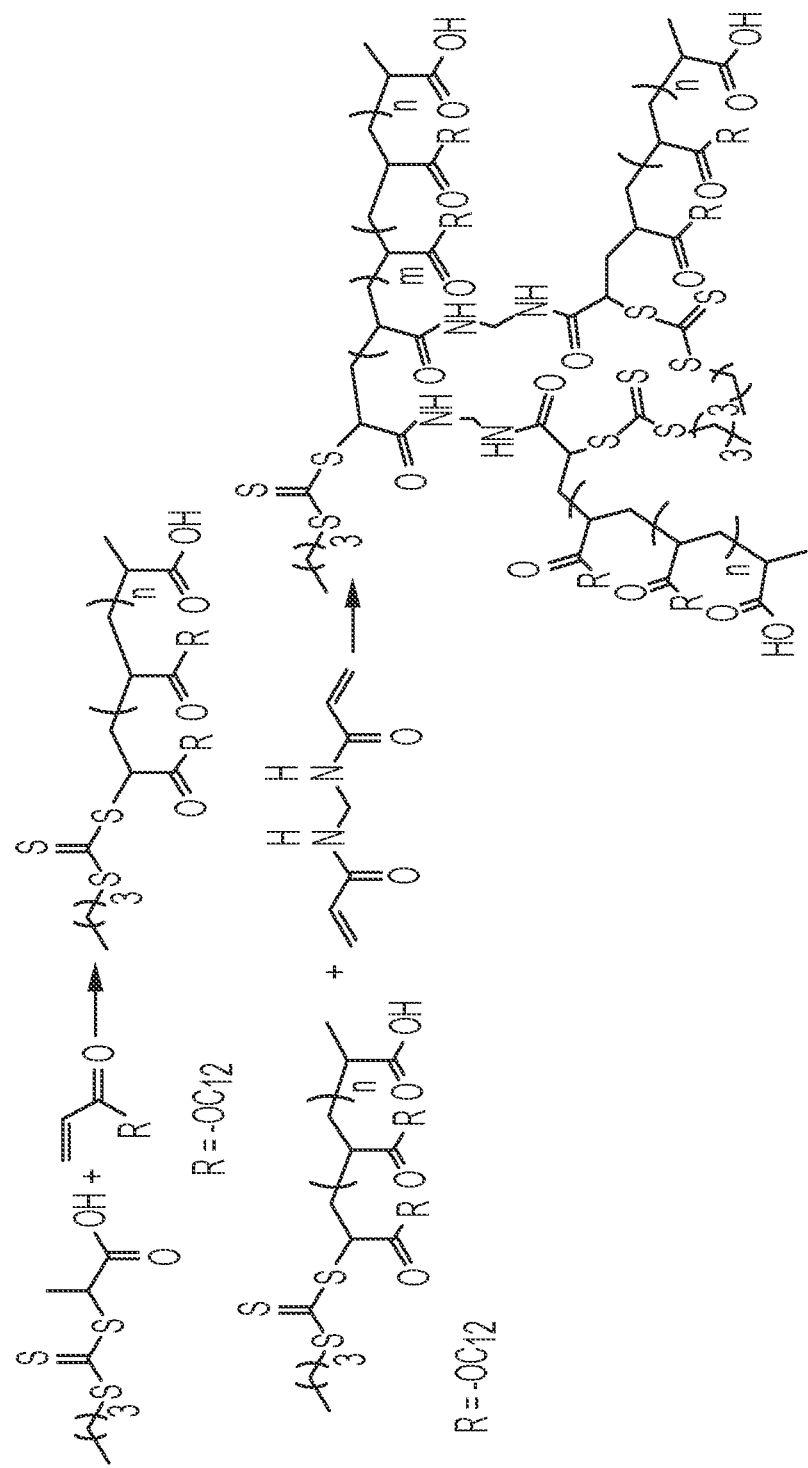
FIG. 3 schematically depicts the synthesis of a hydrophobic branched star polymer, according to one or more embodiments of this disclosure.

Hydrophobic branched star copolymer SP-02 was synthesized using poly(lauryl acrylate) (monomer B). RAFT polymerization was also used in this synthesis to polymerize a short segment of lauryl acrylate. The synthesized linear polymer was then crosslinked with methylene bisacrylamide (monomer C) to form SP-02. The reaction mechanism is shown in FIG. 3. Based on thermogravimetric analysis, SP-02 began degrading at approximately 400° C. The hydrodynamic diameter of SP-02 was determined via dynamic light scattering to be approximately 15 nm. Additionally, the PDI of SP-02 was determined via dynamic light scattering to be approximately 16.7%.

Amphiphilic branched star copolymer SP-01-G2 was synthesized using acrylic acid (monomer A) and lauryl acrylate (monomer B). RAFT polymerization was used to initially polymerize a short segment of acrylic acid. Lauryl acrylate was then added to enable synthesis of block copolymer poly(acrylic acid)-block-poly(lauryl acrylate). The synthesized block copolymer was then crosslinked with methylene bisacrylamide (monomer C) to form SP-01. An additional desulfurization step was then performed. The desulfurization was carried out by placing SP-01 in a 50/50 toluene/isopropanol mixture in the presence of a benzoyl peroxide initiator. The mixture was purged under nitrogen before performing the desulfurization at 100° C.

Based on thermogravimetric analysis, SP-01-G2 began degrading at approximately 400° C. The hydrodynamic diameter of SP-01-G2 was determined via dynamic light scattering to be approximately 53 nm. It was observed than when the hydrodynamic diameter of the branched star polymer is in the nanoscale, the branched star polymer is able to provide low fluid loss and thin filter cake. Commercial products with larger hydrodynamic diameter provided higher fluid loss values and/or thicker filter cakes. In particular, Pliolite DF01 (described below) was found to have a hydrodynamic diameter of 206 nm. Additionally, Versatrol HT (described below) was found to have a hydrodynamic diameter of 350 microns. Low fluid loss values are desirable to minimize the change in rheology of drilling fluids during drilling due to loss of fluids into the formation. In addition, a thin filter cake during drilling ensures that a variety of issues, such as stuck pipe, are avoided. Branched star polymer with smaller diameters, such as those within the nanoscale, are able to fill up the porosity of the filter cakes more efficiently than particles with larger diameters. This provides a filter cake with better sealing and reduces the loss of fluids into the formation.

Additionally, the PDI of SP-01-G2 was determined via dynamic light scattering to be approximately 20%. The PDI of Pliolite DF01 was determined via dynamic light scattering to be approximately 5.79%. The PDI of Versatrol HT was determined via dynamic light scattering to be approximately 33.1%.

To formulate the drilling fluids, diesel, Geltone V, Versamul, Versacoat, lime, and RM63 were added sequentially within 1-2 minutes apart and sheared for 20 minutes. Geltone V was a viscosifier available from Halliburton. Versamul was an emulsifier available from Schlumberger. Versacoat was a surfactant available from Schlumberger. RM-63 was a polymeric rheology modifier available from Baroid. Calcium chloride saturated brine & DI water, and optionally the fluid loss control additive, were then added sequentially within 1-2 minutes apart and sheared for 20 minutes. Barite was then added and shearing was carried out for 20 minutes. RevDust was then added and shearing was carried out for 5 minutes. The drilling fluid was then pressurized at 500 pounds per square inch (psi) in a pressure cell and hot rolled at 350° F. for 16 hours.

SP-01, SP-02, LP-01, LP-02, and Versatrol HT were added to a drilling fluid having the composition shown in Table 5 to form drilling fluids B, C, D, E, and F. Drilling fluid A did not have a fluid loss control additive. LP-01 and LP-02 were analogues of SP-01 and SP-02 without crosslinker. LP-01 included block copolymer of poly(acrylic acid)-block-poly(lauryl acrylate) without a crosslinker. Similarly, LP-02 included poly(lauryl acrylate) homopolymer without a crosslinker. Versatrol HT was an asphalt resin available from Schlumberger.

TABLE 5

Base drilling fluid composition for drilling fluids A-F

| Component | Weight (grams) |
| --- | --- |
| Diesel | 192 |
| Geltone V | 2 |
| Lime | 6 |
| Versamul | 8 |
| Versacoat | 4 |
| Water | 22.48 |
| CaCl$_2$ brine | 53.27 |
| RM-63 | 2 |
| Fluid loss control additive | 4 |
| Barite | 209 |
| Rev dust | 20 |

The total weight of the drilling fluid was 522.75 grams, and the drilling fluid had a density of 12 pounds per gallon.

SP-01-G2, Pliolite DF01, and Versatrol HT were added to drilling fluids using the method described previously, and formed drilling fluids G, H, and I having the composition shown in Table 6. Pliolite DF01 was a styrene butadiene polymer drilling fluid loss control additive available from Eliokem (now available as Pexotrol 552 from Omnova Solutions). Drilling fluid J did not have a fluid loss control additive.

TABLE 6

Drilling fluid composition for drilling fluids G-J

| Fluid Formulations (lb/bbl) | Drilling fluid G | Drilling fluid H | Drilling fluid I | Drilling fluid J |
| --- | --- | --- | --- | --- |
| Diesel | 178.3 | 178.3 | 178.3 | 178.3 |
| Geltone V | 4 | 4 | 4 | 4 |
| RM63 | 2 | 2 | 2 | 2 |
| Lime | 10 | 10 | 10 | 10 |
| Versamul | 10 | 10 | 10 | 10 |
| Versacoat | 5 | 5 | 5 | 5 |
| DI water | 18.58 | 18.58 | 18.58 | 18.58 |
| Calcium chloride saturated brine | 53.27 | 53.27 | 53.27 | 53.27 |
| SP-01-G2 | 3.6 | — | — | — |
| Pliolite DF01 | — | 4 | — | — |
| Versatrol HT | — | — | 4 | — |
| Barite | 280 | 280 | 280 | 280 |
| Rev Dust | 50 | 50 | 50 | 50 |
| Density, lb/gal | 13.4 | 13.4 | 13.4 | 13.4 |
| Aging temp., ° F. | 300 | 300 | 300 | 300 |
| Aging conditions | rolling | rolling | rolling | rolling |
| Aging period, hr | 16 | 16 | 16 | 16 |

The Roller Oven model 705ES, manufactured by Fann, was used for the hot rolling experiment conducted at 300° F. and atmospheric pressure for 16 hours. The Electrical Stability Tester model 23E, manufactured by Fann, was used to measure the relative chemical stability of the drilling fluid both before and after hot rolling. Conventionally, a value of greater than 200 volts is considered to be a chemically stable invert emulsion. A fluid loss test was conducted on the drilling fluid with a Fann High Pressure High Temperature (HPHT) Filter Press Series 387 (175 mL) which comes equipped with Fann Model 741 Temperature Controller. The fluid loss test was conducted at 350° F. at a differential pressure of 500 psi for 30 minutes. The table below shows the electrical stability of the drilling fluids before hot rolling (BHR) and after hot rolling (AHR), as well as the results of the fluid loss test conducted.

TABLE 7

Drilling fluid properties.

| Drilling fluid | Fluid loss control additive | Electrical stability BHR (volts) | Electrical stability AHR (volts) | Fluid loss (mL) | Filter cake thickness (inches) |
| --- | --- | --- | --- | --- | --- |
| A | None | 666 | 167 | 30 | — |
| B | Versatrol HT | 729 | 282 | 2 | — |
| C | SP-01 | 724 | 473 | 2.4 | — |
| D | SP-02 | 503 | 557 | 2.8 | — |
| E | LP-01 | 389 | 250 | 4.4 | — |
| F | LP-02 | 625 | 310 | 4.0 | — |
| G | SP-01-G2 | 582 | 385 | <1 | 2/32" |
| H | Pliolite DF01 | 476 | 238 | 2.8 | 8/32" |
| I | Versatrol HT | 580 | 308 | 8.2 | 16/32" |
| J | None | 491 | 273 | 2.8 | 16/32" |

Table 7 shows that the drilling fluids including branched star polymers (drilling fluids C, D, and G) had much lower fluid loss than the drilling fluids including the linear star polymers (drilling fluids E and F) that were not crosslinked. Therefore, crosslinking the star polymer seems to decrease fluid loss. Additionally, drilling fluid C exhibited lower fluid loss than drilling fluids A, H, I, and J, which had either no fluid loss control additive, or had conventional fluid loss control additives.

Table 7 further shows that drilling fluids including Versatrol HT (drilling fluids B and I) exhibit a relatively large stability drop after hot rolling as compared to drilling fluids including branched star polymers (drilling fluids C, D, and G).

Based on Table 7, SP-01-G2 was able to provide not only fluid loss control but also ensure a thin filter cake. SP-01-G2 resulted in less fluid loss than SP-01 because SP-01-G2 does not have a reactive thiocarbonylthio RAFT end groups. The lack of carbon-sulphur (C—S) bond in SP-01-G2 in comparison to SP-01 provides a higher temperature stability to the former as the C—S can decompose at temperatures greater than 120° C. The higher temperature stability of SP-01-G2 results in a lower degradation during hot rolling and HTHP fluid loss testing as compared to SP-01. But the low fluid loss values for SP-01-G2 can be associated with higher temperature stability of SP-01-G2 (with the lack of C—S bond) over SP-01.

The thickness of the filter cake was determined by using a pair of calipers. Drilling fluid G exhibited a filter cake thickness of approximately 2/32", whereas Drilling Fluids H, I, and J each exhibited a filter cake thickness of 5/32" or greater.

Example 2

Amphiphilic branched star polymer FLCA-134 having an HLB of approximately 12.164 was synthesized using acrylic acid (monomer A), lauryl acrylate (monomer B), and methylene bisacrylamide as a crosslinker (crosslinker C).

The procedure for synthesizing branched star polymers for water-based drilling fluids is described below.

The apparatuses used for the procedure included two round bottom flasks: 50 mL & 250 mL were used, along with a thermocouple, a rubber septum, long and short needles, pipettes, electrical tape, a stirrer bar, a stirrer bar picker, and a thermal hot plate (a RT2 Advanced Hotplate Stirrer, available from Thermo Scientific).

The materials used for the procedure included acrylic acid (AA), polyacrylic acid (PAA), poly(acrylic acid)-block-poly (lauryl acrylate) (PAA-b-PLA), 2-(Butylthiocarbonothioylthio)propanoic acid (BTPA), 2,2'-Azobis(2-methylpropionitrile)(AIBN), tetrahydrofuran (THF), and methylene bisacrylamide (MBA).

The materials used in synthesizing PAA are described in Table 8 below:

TABLE 8

Formulation for the synthesis of PAA.

| Materials | No. of Moles | Mass (g) | Volume (mL) | | |
|---|---|---|---|---|---|
| AA | 0.1593 | 11.48 | 10.92 | monomer concentration | 4.561M |
| BTPA | 0.00187 | 0.4468 | | total volume | 47.42 mL |
| THF | — | — | 36.5 | total mass | 11.93 g |
| AIBN | 0.000187 | 0.04468 | — | | |

The chemicals listed in Table 8 were placed in a 50 mL round bottom flask with a stirrer bar. The initial synthesis of PAA was then carried out. The reaction vessel was sealed with a septum and secured with electrical tape. The reaction vessel was then purged under nitrogen for 20-30 mins. The reaction was then carried out for 3 hours at 60° C. in a thermal bath while stirring. The reaction was stopped by cooling under room temperature followed by placing the reaction vessel in an ice bath. The reaction mixture was then dried overnight in a vacuum oven at 50° C. or under continuous air blowing to remove any solvent.

The materials used in synthesizing the block copolymer of PAA-block-PLA are described in Table 9 below:

TABLE 9

Formulation for the synthesis of block copolymer of PAA-block-PLA.

| Materials | No. of moles | Mass (g) | Volume (mL) | | |
|---|---|---|---|---|---|
| PAA | 0.00187 | 11.93 | | monomer concentration | 0.2465M |
| Lauryl Acrylate (LA) | 0.0187 | 4.505 | 5.096 | total volume | 76.019 mL |
| THF | | | 23.5 | total mass | 16.43 g |
| AIBN | 0.0002 | 0.0308 | | | |

THF was then added to the dried reaction mixture and stirred with a stirrer bar to dissolve the dried solid. The remaining materials from Table 9 were then added to the flask and stirred until complete homogenization is achieved. The flask was sealed with a septum and secured with electrical tape. The reaction was then purged under nitrogen for 30 minutes. The reaction was then carried out for 18 hours at 60° C. in a thermal bath while stirring. The reaction was stopped by cooling under room temperature followed by placing the reaction vessel in an ice bath.

The materials used in synthesizing the star polymer of PAA-block-PLA are described in Table 10 below:

TABLE 10

Formulation for the synthesis of star polymer of PAA-block-PLA.

| Materials | No. of moles | Mass(g) | Volume (mL) | | |
|---|---|---|---|---|---|
| PAA-b-PLA | 0.00187 | 16.43 | 76.02 | polymer concentration | 0.01M |
| Methylene biscarylamide | 0.0187 | 2.890 | | total volume | 193.1 mL |
| THF | | | 117.1 | total mass | 19.32 g |
| AIBN | 0.000187 | 0.0307 | | | |

Crosslinking of poly(acrylic acid)-block-poly(lauryl acrylate) (PAA-b-PLA) to form amphiphilic branched star polymer was carried using the formulation in Table 10. Polymerization of lauryl acrylate was carried out for 8 hours in an inert nitrogen environment while stirring at 60° C. Each poly(acrylic acid)-block-poly(lauryl acrylate) (PAA-b-PLA) chain had an average of 85 units of acrylic acid monomer and 10 units of lauryl acrylate crosslinked with 10 units of methylene bisacrylamide giving a theoretical number average molecular weight ($M_n$) of 10070 g/mol for each block copolymer chain.

The hydrophilic-lipophilic balance (HLB) of the amphiphilic block copolymer and amphiphilic branched star polymer FLCA-134 is the measure of the degree to which it is hydrophilic or lipophilic, which may be determined by the Griffin Method calculation, as previously described. The amphiphilic block copolymer had a molecular weight of PAA of approximately 6364 g/mol and a molecular weight of PAA-block-PLA of approximately 8529 g/mol. Therefore, the amphiphilic block copolymer had a HLB of approximately 14.92. The amphiphilic branched star polymer FLCA-134 had a molecular weight of PAA of approximately 6364 g/mol, a molecular weight of PAA-block-PLA of approximately 8529 g/mol, and a molecular weight of PAA-block-PLA-block-PMBA of approximately 10071 g/mol, Therefore, the amphiphilic branched star polymer FLCA-134 had a HLB of approximately 12.64.

The amphiphilic branched star polymer FLCA-134 had a PDI determined via dynamic light scattering of 25.1%. The amphiphilic branched star polymer FLCA-134 had a hydrodynamic diameter determined via dynamic light scattering of 137 nm. The dynamic light scattering measurements were performed using a Particle Analyzer Litesizer 500 running Kalliope software (40 mW, semiconductor laser, $\lambda$=658 nm). The temperature was stabilized to ±0.1° C. of the set temperature 25° C. Hydrodynamic radii were calculated by the non-negative least squares (NNLS) algorithm using the manufacturer's software.

To determine the ability of the amphiphilic branched star polymer FLCA-134 to provide fluid loss control, water-based drilling fluids were first formulated as shown in Table 11. Barathin Plus, available from Halliburton, was used as a deflocculant/thinner. The barite was available from MI SWACO under the commercial name M-I WATE* (ALL GRADES). The Aramco High Temperature Viscosifier was a methacrylate-based viscosifier. The MgO was available from Fritz Industries under the commercial name Fritz Bond EX-M. The KCl was available from Fisher Chemical under the commercial name Potassium Chloride (Crystalline).

TABLE 11

Drilling fluid composition for drilling fluids K, L, and M.

| Fluid Formulations (lb/bbl) | Drilling fluid K | Drilling fluid L | Drilling fluid M |
|---|---|---|---|
| Water | 276.5 | 276.5 | 276.5 |
| MgO (pH buffer) | 4.5 | 4.5 | 4.5 |
| KCl | 8 | 8 | 8 |
| Aramco High Temperature Viscosifier | 3.25 | 3.25 | 3.25 |
| Barathin Plus | 3 | 3 | 3 |
| Barite | 311 | 311 | 311 |
| Sepiolite Pangel S9 - Cary Company | 4 | 4 | 4 |
| FLCA-134 | — | 2 | 6 |
| Density, lb/gal | 14 | 14 | 14 |
| Aging temp., ° F. | 300 | 300 | 300 |
| Aging conditions | rolling | rolling | rolling |
| Aging period, hr | 16 | 16 | 16 |
| pH before aging | 9.6 | 9.46 | 9.3 |
| pH after aging | 8.04 | 7.95 | 8.7 |

Drilling Fluids K, L, and M had the same base drilling fluid composition, but Drilling Fluid K did not include the amphiphilic branched star polymer FLCA-134, Drilling Fluid L included 2 lb/bbl of the amphiphilic branched star polymer FLCA-134, and Drilling Fluid M included 6 lb/bbl of the amphiphilic branched star polymer FLCA-134.

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours.

TABLE 12

Rheology data for drilling fluids K, L, and M at a temperature of 120° F.

| | Drilling fluid K (before hot rolling) | Drilling fluid K (after hot rolling) | Drilling fluid L (before hot rolling) | Drilling fluid L (after hot rolling) | Drilling fluid M (before hot rolling) | Drilling fluid M (after hot rolling) |
|---|---|---|---|---|---|---|
| 600 rpm | 185 | 120 | 218 | 214 | 223 | 200 |
| 300 rpm | 122 | 82 | 144 | 139 | 147 | 129 |

TABLE 12-continued

Rheology data for drilling fluids K, L, and M at a temperature of 120° F.

| | Drilling fluid K (before hot rolling) | Drilling fluid K (after hot rolling) | Drilling fluid L (before hot rolling) | Drilling fluid L (after hot rolling) | Drilling fluid M (before hot rolling) | Drilling fluid M (after hot rolling) |
|---|---|---|---|---|---|---|
| 200 rpm | 94 | 69 | 112 | 107 | 116 | 100 |
| 100 rpm | 62 | 53 | 74 | 72 | 85 | 64 |
| 6 rpm | 14 | 30 | 21 | 20 | 38 | 12 |
| 3 rpm | 11 | 27 | 16 | 14 | 34 | 8 |
| 10 second gel strength, lbf/100 ft$^2$ | 11 | 29 | 16 | 13 | 32 | 8 |
| 10 minute gel strength, lbf/100 ft$^2$ | 11 | 53 | 32 | 37 | 48 | 13 |
| Apparent viscosity, cP | 93 | 60 | 109 | 107 | 112 | 100 |
| PV, cP | 63 | 38 | 74 | 75 | 76 | 71 |
| YP, lb/100 ft$^2$ | 59 | 44 | 70 | 64 | 71 | 58 |
| LPLT Fluid Loss, mL | 8.4 | | 5.5 | | 5.0 | |
| Filter Cake Thickness, inches | 2/32 | | 1/32 | | 5/32 | |

As demonstrated in Table 12 in Drilling Fluids K, L and M, increasing the amount of FLCA-134 from 0 lb/bbl (Drilling Fluid K) to 2 lb/bbl (Drilling Fluid L) and finally to 6 lb/bbl (Drilling Fluid M) led to a drop in low shear dial readings (at 3 and 6 RPM) as well as gel strengths, particularly for hot rolled drilling fluids. It can be safely assumed that increasing the amount of FLCA-134 has an antagonistic effect with the functions of Sepiolite (an additive added to improve and increase the low shear dial readings). There is a fine tuning of the formulation that is needed when Sepiolite and FLCA-134 are added into the formulation. As shown in Tables 11 and 12, FLCA-134 with a loading of 2 lb/bbl is sufficient for fluid loss control The filter cake thickness was determined by conducting a fluid loss test with a Fann Low Pressure Low Temperature (LPLT) Filter Press Series 300 (350 mL). The fluid loss test was conducted at ambient temperature and a differential pressure of 100 psi for 30 minutes. The thickness of the filter cake was determined by using a pair of calipers.

Drilling fluid K exhibited a filter cake thickness of approximately 2/32", Drilling fluid L exhibited a filter cake thickness of approximately 1/32", and Drilling fluid M exhibited a filter cake thickness of approximately 5/32". As described in this disclosure, low fluid loss values are desirable to minimize the change in rheology of drilling fluids during drilling due to loss of fluids into the formation. In addition, a thin filter cake during drilling ensures that a variety of issues, such as stuck pipe, are avoided. Branched star polymer with smaller diameters, such as those within the nanoscale, are able to fill up the porosity of the filter cakes more efficiently than particles with larger diameters. This provides a filter cake with better sealing and reduces the loss of fluids into the formation. As the measurement for LPLT fluid loss is done in a static condition, where the mud is pressurized from the top in a LPLT cell, sufficient gel strength is needed to suspend solids and weighting materials. As the Fluid M has the lowest gel strength compared to fluids K and L, it is hardly surprising that the solids collapsed under pressure during LPLT measurements leading to thick filter cake.

The rheology data in Table 12 shows that increasing the amount of amphiphilic branched star polymer from 0 lb/bbl (Drilling fluid K) to 2 lb/bbl (Drilling fluid L) and finally to 6 lb/bbl (Drilling fluid M) led to a drop in low shear dial readings (at 6 and 3 rpm) as well as a decrease in gel strengths, particularly after hot rolling. Therefore, it was determined that increasing the amount of amphiphilic branched star polymer present in the drilling fluids had an antagonistic effect with the functions of the Sepiolite Pangel S9, available from Cary Company (which was added to improve and increase the low shear dial readings). The sepiolite was added together with the formulation during mixing and aged/hot rolled at 300° F. for 16 hours. As Sepiolite is stable under high temperature (up to 400° F.), it is able to provide a stable low shear yield point unlike polymers that undergo thermal thinning or degrade at high temperatures. In addition, thermal thinning can also lead to loss of gel strengths, and therefore, loss of suspension capabilities of drill solids and weighting materials. Sepiolite is able to prevent this by maintaining a stable viscometer reading at 3 and 6 RPM.

Comparative water-based drilling fluids were then formulated as shown in Table 13 using conventional fluid loss control additives. Drilling fluids N and O included 2 lb/bbl and 1 lb/bbl FL-20, an acrylic polymer available from Fritz, as a fluid loss control additive, respectively. Drilling fluid P included 2 lb/bbl Therma-Chek®, available from Halliburton, as a fluid loss control additive. Drilling fluid Q included 2 lb/bbl FL-17, an acrylic polymer available from Fritz, as a fluid loss control additive. Drilling fluid R included 2 lb/bbl FL-29, an acrylic polymer available from Fritz, as a fluid loss control additive.

TABLE 13

Drilling fluid composition for drilling fluids N, O, P, Q, and R.

| Fluid Formulations (lb/bbl) | Drilling fluid N | Drilling fluid O | Drilling fluid P | Drilling fluid Q | Drilling fluid R |
|---|---|---|---|---|---|
| Water | 276.5 | 276.5 | 276.5 | 276.5 | 276.5 |
| MgO (pH buffer) | 4.5 | 4.5 | 4.5 | 4.5 | 4.5 |
| KCl | 8 | 8 | 8 | 8 | 8 |
| Aramco High Temperature Viscosifier | 3.25 | 3.25 | 3.25 | 3.25 | 3.25 |
| Barathin Plus | 3 | 3 | 3 | 3 | 3 |
| Barite | 311 | 311 | 311 | 311 | 311 |
| Sepiolite Pangel S9 - Cary Company | 4 | 4 | 4 | 4 | 4 |
| Conventional Fluid Loss Control Additive | 2 (FL-20) | 1 (FL-20) | 2 (Therma-Chek) | 2 (FL-17) | 2 (FL-29) |
| Density, lb/gal | 14 | 14 | 14 | 14 | 14 |
| Aging temp., ° F. | 300 | 300 | 300 | 300 | 300 |
| Aging conditions | rolling | rolling | rolling | rolling | rolling |
| Aging period, hr | 16 | 16 | 16 | 16 | 16 |
| pH before aging | 9.52 | 10 | 10 | 10 | 10 |
| pH after aging | 7.75 | 8 | 8 | 8 | 8 |

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours. The rheology data is shown in Table 14. It is of note that the rheological characteristics of the drilling fluids before hot rolling are not as characteristic of field use of the drilling fluids, as initially mixing the drilling fluid components in a mixer does not allow for all the components to homogenize equally. Hot rolling is often needed as it allows for the formulation to mix and homogenize. Therefore, only fluids that are hot rolled are used for fluid loss testing. Although the rheological characteristics of the tested drilling fluids are provided for completeness, the measurements after hot rolling are most indicative of field performance.

TABLE 14

Rheology data for drilling fluids N, O, P, Q, and R at a temperature of 120° F.

|  | Drilling fluid N (before hot rolling) | Drilling fluid N (after hot rolling) | Drilling fluid O (before hot rolling) | Drilling fluid O (after hot rolling) |
|---|---|---|---|---|
| 600 rpm | 275 | 222 | 195 | 173 |
| 300 rpm | 188 | 154 | 125 | 113 |
| 200 rpm | 152 | 127 | 95 | 93 |
| 100 rpm | 105 | 94 | 62 | 68 |
| 6 rpm | 32 | 35 | 16 | 51 |
| 3 rpm | 29 | 28 | 12 | 45 |
| 10 second gel strength, lbf/100 ft² | 28 | 29 | 11 | 34 |
| 10 minute gel strength, lbf/100 ft² | 84 | 54 | 23 | 63 |
| Apparent viscosity, cP | 138 | 111 | 98 | 87 |
| PV, cP | 87 | 68 | 70 | 60 |
| YP, lb/100 ft² | 101 | 86 | 55 | 53 |
| LPLT Fluid Loss, mL |  | 5.4 |  | 9.2 |
| Filter Cake Thickness, inches |  | 2/32 |  | 5/32 |

|  | Drilling fluid P (before hot rolling) | Drilling fluid P (after hot rolling) | Drilling fluid P (where 30 grams of water was added after hot rolling) | Drilling fluid Q (after hot rolling) | Drilling fluid Q (before hot rolling) | Drilling fluid R (after hot rolling) |
|---|---|---|---|---|---|---|
| 600 rpm | 218 | 229 | 154 | 215 | 266 | 180 |
| 300 rpm | 166 | 149 | 96 | 134 | 176 | 112 |
| 200 rpm | 103 | 117 | 71 | 99 | 144 | 82 |
| 100 rpm | 62 | 79 | 45 | 62 | 100 | 49 |
| 6 rpm | 11 | 21 | 9 | 13 | 39 | 7 |
| 3 rpm | 8 | 15 | 7 | 9 | 32 | 4 |

TABLE 14-continued

Rheology data for drilling fluids N, O, P, Q, and R at a temperature of 120° F.

| | | | | | | |
|---|---|---|---|---|---|---|
| 10 second gel strength, lbf/100 ft$^2$ | 8 | 19 | 6 | 10 | 36 | 5 |
| 10 minute gel strength, lbf/100 ft$^2$ | 23 | 64 | 15 | 16 | 90 | 11 |
| 30 minute gel strength lbf/100 ft$^2$ | | 79 | | | 122 | |
| Apparent viscosity, cP | 109 | 115 | 77 | 108 | 133 | 90 |
| PV, cP | 52 | 80 | 58 | 81 | 90 | 68 |
| YP, lb/100 ft$^2$ | 114 | 69 | 38 | 53 | 86 | 44 |
| LPLT Fluid Loss, mL | | 4.6 | | Gelling after rolling | | Solid gel formation after rolling |
| Filter Cake Thickness, inches | | 1/32" | | Gelling after rolling | | Solid gel formation after rolling |

30 grams of water was added to Drilling fluid P after hot rolling because Drilling fluid P was too thick given the 10 sec and 10 min gel strengths. In addition, an increase in gel strength was also seen after when a 30 min gel strength measurement was taken. The continuous build-up of gel strength led to the fluid to act like a thick paste. In order to improve the flowability and measure the fluid loss of a fluid and not a paste, additional water was added.

The filter cake thickness was determined by conducting a fluid loss test with a Fann Low Pressure Low Temperature (LPLT) Filter Press Series 300 (350 mL). The fluid loss test was conducted at a differential pressure of 100 psi for 30 minutes. The thickness of the filter cake was determined by using a pair of calipers.

Drilling fluid N exhibited a filter cake thickness of approximately 2/32", Drilling fluid O exhibited a filter cake thickness of approximately 5/32", Drilling fluid P exhibited a filter cake thickness of approximately 1/32", and the filter cake thickness of Drilling fluids Q and R could not be determined because Drilling fluid Q gelled after rolling, and Drilling fluid R exhibited solid gelling after rolling. It is noted that for equal concentration of fluid loss control additive added (2 lb/bbl), Drilling Fluid P (which included the conventional additive Therma-Chek) resulted in a final fluid that was too thick and difficult to be pumped downhole due to continuous buildup of gel, whereas Drilling fluid L (which included the amphiphilic branched star polymer FLCA-134) did not exhibit these issues of continuous gelling.

Drilling fluid N (which included FL-20 as a fluid loss control additive) provided similar fluid loss but a thicker filter cake when compared to Drilling fluid L (which included the amphiphilic branched star polymer). In addition, both before and after hot rolling, the 10-min gel strengths of Drilling fluid N were relatively higher than Drilling fluid L. In embodiments, a gel strength greater than 37, greater than 40, greater than 45, or greater than 50 lbf/100 ft$^2$ is not ideal as it will lead to high pump initiation pressure to break circulation after mud is in a static condition for a period of time. High pump pressure may result in formation fracture and lost circulation. Reducing FL-20 loading to 1 lb/bbl (Drilling fluid O) did not help reduce the gel strength, as shown in Drilling fluid O. In addition, reducing the loading of FL-20 to 1 lb/bbl (Drilling fluid O, in comparison to Drilling fluid N, which had 2 lb/bbl) led to poor control of fluid loss, as the LPLT fluid loss was 9.2 mL (whereas Drilling fluid N exhibited 5.4 mL fluid loss), and the filter cake thickness increased to 5/32" (whereas Drilling fluid N had 2/32" filter cake thickness). A similar problem was observed in Drilling fluid Q, which included 2 lb/bbl of FL-17, where excessive gel strengths built up and prevented any reasonable measurement of LPLT fluid loss. FL-29 led to an extreme case of gelling where solid gel formed after hot rolling preventing rheology and fluid loss measurements. Drilling fluid P, which included 2 lb/bbl Therma-Chek, also led to high gel strengths but dilution after hot rolling led to fluid loss and filter cake thickness that is close to Drilling fluid L.

To determine the ability of the amphiphilic branched star polymer to provide fluid loss control without the addition of Sepiolite, as Sepiolite and the amphiphilic branched star polymer had an adverse combination shown in Drilling fluid M, water-based drilling fluids were formulated as shown in Table 15.

TABLE 15

Drilling fluid composition for drilling fluids S, T, and U.

| Fluid Formulations (lb/bbl) | Drilling fluid S | Drilling fluid T | Drilling fluid U |
|---|---|---|---|
| Water | 276.5 | 276.5 | 276.5 |
| MgO (pH buffer) | 4.5 | 4.5 | 4.5 |
| KCl | 8 | 8 | 8 |
| Aramco High Temperature Viscosifier | 3.25 | 3.25 | 3.25 |
| Barathin Plus | 3 | 3 | 3 |
| Barite | 311 | 311 | 311 |
| Amphiphilic Branched Star Polymer | — | 3 | 4 |
| Density, lb/gal | 14 | 14 | 14 |
| Aging temp., ° F. | 300 | 300 | 300 |
| Aging conditions | rolling | rolling | rolling |
| Aging period, hr | 16 | 16 | 16 |
| pH before aging | 11.4 | 9.58 | 9.5 |
| pH after aging | 8.5 | 8.2 | 8.3 |

Drilling Fluids S, T, and U had the same base drilling fluid composition, but Drilling Fluid S did not include the amphiphilic branched star polymer, Drilling Fluid T included 3 lb/bbl, and Drilling Fluid U included 4 lb/bbl of the amphiphilic branched star polymer.

A Fann 35 rheometer was then used to measure the rheology of the fluid before and after hot rolling. The Roller Oven model 705ES, manufactured by Fann, was used for the hot rolling, which was conducted at 300° F. and atmospheric pressure for 16 hours.

TABLE 12

Rheology data for drilling fluids S, T, and U at a temperature of 120° F.

| | Drilling fluid S (before hot rolling) | Drilling fluid S (after hot rolling) | Drilling fluid T (before hot rolling) | Drilling fluid T (after hot rolling) | Drilling fluid U (before hot rolling) | Drilling fluid U (after hot rolling) |
|---|---|---|---|---|---|---|
| 600 rpm | 153 | 107 | 183 | 154 | 190 | 185 |
| 300 rpm | 96 | 61 | 112 | 95 | 120 | 119 |
| 200 rpm | 72 | 45 | 84 | 72 | 92 | 89 |
| 100 rpm | 44 | 26 | 53 | 44 | 59 | 55 |
| 6 rpm | 6 | 4 | 17 | 7 | 18 | 9 |
| 3 rpm | 4 | 3 | 13 | 5 | 15 | 7 |
| 10 second gel strength, lbf/100 ft$^2$ | 4 | 4 | 11 | 5 | 12 | 6 |
| 10 minute gel strength, lbf/100 ft$^2$ | 12 | 7 | 24 | 10 | 28 | 13 |
| Apparent viscosity, cP | 77 | 54 | 92 | 77 | 95 | 93 |
| PV, cP | 57 | 46 | 71 | 59 | 70 | 66 |
| YP, lb/100 ft$^2$ | 39 | 15 | 41 | 36 | 50 | 53 |
| LPLT Fluid Loss, mL | Settling - no measurement | | 4.6 | | 4.6 | |
| Filter Cake Thickness, inches | Settling - no measurement | | 1/32 | | 1/32 | |

It can been seen in Drilling fluid S that the absence of Sepiolite and the amphiphilic branched star polymer results in low shear rheology and low gel strengths. Additionally, settling in Drilling fluid S is seen with no fluid loss measurement or filter cake thickness measurement possible. When the amphiphilic branched star polymer is added in increasing amounts (in Drilling fluids T and U), improvements in the low shear rheology is seen with increased gel strengths. In addition, no settling is observed in either Drilling fluid T or Drilling fluid U, and both Drilling fluids T and U exhibited a fluid loss of 4.6 mL and a filter cake thickness of 1/32". In other words, the amphiphilic branched star polymer FLCA-134 not only provided fluid loss control but also acted to provide reduced fluid viscosity and increased gel strength. Most water soluble commercial fluid loss control additives, as seen in Table 13 and Table 14, led to water-based muds with high viscosities and even gelling. This is not ideal as the highly viscous fluids cannot be easily pumped downhole. Therefore, the drilling fluids including the amphiphilic branched star polymer of the present disclosure exhibits fluid loss control as well as improving pumpability as compared to drilling fluids including conventional fluid loss control additives.

The description of the embodiments is illustrative in nature and is in no way intended to be limiting it its application or use. As used throughout this disclosure, the singular forms "a," "an" and "the" include plural references unless the context clearly dictates otherwise. Thus, for example, reference to "a" component includes aspects having two or more such components, unless the context clearly indicates otherwise.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

The presently described subject matter may include one or more aspects, which should not be regarded as limiting on the teaching of the present disclosure. A first aspect may include cement slurry comprising: an aqueous phase; a cement precursor material; and a hydrophilic branched star polymer, wherein the hydrophilic branched star polymer is a crosslinked, polymerized reaction product of crosslinker C and hydrophilic monomer A and hydrophilic monomer B and optionally hydrophilic monomer D, the crosslinked polymerized reaction product comprising: a plurality of block copolymer segments of hydrophilic monomer A and hydrophilic monomer B interconnected via crosslinker C; a plurality of block copolymer segments of hydrophilic monomer A, hydrophilic monomer B, and hydrophilic monomer D interconnected via crosslinker C; or combinations thereof.

A second aspect may include cement slurry comprising: an aqueous phase; a cement precursor material; and an amphiphilic branched star polymer, wherein the amphiphilic branched star polymer is a crosslinked, polymerized reaction product of crosslinker C and hydrophilic monomer A and hydrophobic monomer B and optionally hydrophilic monomer D, the crosslinked polymerized reaction product comprising: a plurality of block copolymer segments of hydrophilic monomer A and hydrophobic monomer B interconnected via crosslinker C; a plurality of block copolymer segments of hydrophilic monomer A, hydrophobic monomer B, and hydrophilic monomer D interconnected via crosslinker C; or combinations thereof.

Another aspect may include any of the previous aspects, in which the cement slurry comprises from 0.05 to 10 wt. % of the branched star polymer.

Another aspect may include any of the previous aspects, in which the hydrophilic branched star polymer has a molecular weight of greater than 3000 g/mol.

Another aspect may include any of the previous aspects, in which crosslinker C comprises N,N-methylene bis(acrylamide), vinyl aromatic, N,N-methylenebisacrylamide, bis (2-methacryloyl)oxyethyl disulfide, 1,4-bis(4-vinylphenoxy)butane, divinyl benzene, ethylene glycol dimethacrylate, diethylene glycol dimethacrylate, tetra(ethylene glycol) diacrylate, triethylene glycol dimethacrylate, poly(ethylene glycol) dimethacrylate, neopentyl glycol diacrylate, neopentyl glycol propoxylate diacrylate, tri(propylene glycol) diacrylate, or combinations thereof.

Another aspect may include any of the previous aspects, in which monomers A, B, and D are chosen from the group consisting of acrylic acid, 2-acrylamido-2-methylpropane sulfonic acid, 2-acrylamido-ethyl phosphonic acid, maleic acid, N,N-dimethylacrylamide, (3-acrylamidopropyl)trimethylammonium chloride, 2-hydroxyethyl acrylate, styrene-4-ulfonic acid sodium salt, 4-acryloylmorpholine, poly(ethylene glycol), and methyl ether acrylate.

Another aspect may include any of the previous aspects, in which monomer A is acrylic acid, monomer B is N,N-dimethylacrylamide, monomer D is 2-acrylamido-2-methylpropane sulfonic acid, and crosslinker C is N,N-methylene bis(acrylamide).

Another aspect may include any of the previous aspects, in which the hydrophilic branched star polymer comprises from 5 to 75 wt. % of monomer A; the hydrophilic branched star polymer comprises from 15 to 50 wt. % of monomer B; the hydrophilic branched star polymer comprises from 15 to 30 wt. % of crosslinker C; and the hydrophilic branched star polymer comprises from 15 to 50 wt. % of monomer D.

Another aspect may include any of the previous aspects, in which the aqueous phase comprises fresh water, salt water, brine, municipal water, formation water, produced water, well water, filtered water, distilled water, sea water, or combinations thereof.

Another aspect may include any of the previous aspects, in which the cement precursor material comprises one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, calcium aluminate, and combinations thereof.

Another aspect may include any of the previous aspects, further comprising at least one or more additives selected from the group consisting of accelerators, retarders, extenders, weighting agents, fluid loss control agents, lost circulation control agents, viscosifiers, dispersants, pH buffers, electrolytes, glycols, glycerols, dispersion aids, corrosion inhibitors, foamers or defoamers, starches, xanthan gum polymers, surfactants, or combinations thereof.

Another aspect may include any of the previous aspects, in which the cement slurry comprises from 10 wt. % to 70 wt. % of the aqueous phase based on a total weight of the cement slurry.

Another aspect may include any of the previous aspects, in which the cement slurry comprises from 0.05 to 10 wt. % of the amphiphilic branched star polymer.

Another aspect may include any of the previous aspects, in which the amphiphilic branched star polymer has a molecular weight of greater than 3000 g/mol.

Another aspect may include any of the previous aspects, in which crosslinker C comprises N,N-methylene bis(acrylamide), vinyl aromatic, N,N-methylenebisacrylamide, bis (2-methacryloyl)oxyethyl disulfide, 1,4-bis(4-vinylphenoxy)butane, divinyl benzene, ethylene glycol dimethacrylate, diethylene glycol dimethacrylate, tetra(ethylene glycol) diacrylate, triethylene glycol dimethacrylate, poly(ethylene glycol) dimethacrylate, neopentyl glycol diacrylate, neopentyl glycol propoxylate diacrylate, tri(propylene glycol) diacrylate, or combinations thereof.

Another aspect may include any of the previous aspects, in which monomers A, B, and D are chosen from the group consisting of acrylic acid, 2-acrylamido-2-methylpropane sulfonic acid, 2-acrylamido-ethyl phosphonic acid, maleic acid, N,N-dimethylacrylamide, (3-acrylamidopropyl)trimethylammonium chloride, 2-hydroxyethyl acrylate, styrene-4-sulfonic acid sodium salt, 4-acryloylmorpholine, poly (ethylene glycol), methyl ether acrylate, and lauryl acrylate Another aspect may include any of the previous aspects, in which monomer A is acrylic acid, monomer B is lauryl acrylate, monomer D is 2-acrylamido-2-methylpropane sulfonic acid, and crosslinker C is N,N-methylene bis(acrylamide).

Another aspect may include any of the previous aspects, in which the amphiphilic branched star polymer comprises from 5 to 75 wt. % of monomer A; the amphiphilic branched star polymer comprises from 15 to 50 wt. % of monomer B; the amphiphilic branched star polymer comprises from 15 to 30 wt. % of crosslinker C; and the amphiphilic branched star polymer comprises from 15 to 50 wt. % of monomer D.

Another aspect may include any of the previous aspects, in which the aqueous phase comprises fresh water, salt water, brine, municipal water, formation water, produced water, well water, filtered water, distilled water, sea water, or combinations thereof; in which the cement precursor material comprises one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, calcium aluminate, and combinations thereof; and further comprising at least one or more additives selected from the group consisting of accelerators, retarders, extenders, weighting agents, fluid loss control agents, lost circulation control agents, viscosifiers, dispersants, pH buffers, electrolytes, glycols, glycerols, dispersion aids, corrosion inhibitors, foamers or defoamers, starches, xanthan gum polymers, surfactants, or combinations thereof.

Another aspect may include any of the previous aspects, in which the cement slurry comprises from 10 wt. % to 70 wt. % of the aqueous phase based on a total weight of the cement slurry.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A cement slurry comprising an aqueous phase; a cement precursor material; and a hydrophilic branched star polymer, wherein:
the hydrophilic branched star polymer is a crosslinked, polymerized reaction product of crosslinker C and hydrophilic monomer A and hydrophilic monomer B and optionally hydrophilic monomer D,
the hydrophilic branched star polymer consists of:
a first plurality of block copolymer segments interconnected via crosslinker C, wherein each of the block copolymer segments of the first plurality consists of hydrophilic monomer A and hydrophilic monomer B, and wherein monomers A and B are different;
a second plurality of block copolymer segments interconnected via crosslinker C, wherein each of the block copolymer segments of the second plurality consists of hydrophilic monomer A, hydrophilic monomer B, and hydrophilic monomer D, and wherein monomers A, B, and D are different; or both, and
monomers A, B, and D are selected from the group consisting of acrylic acid, 2-acrylamido-2-methylpropane sulfonic acid, 2-acrylamido-ethyl phosphonic acid, maleic acid, N,N-dimethylacrylamide, (3-acrylamidopropyl)trimethylammonium chloride, 2-hydroxyethyl acrylate, styrene-4-sulfonic acid sodium salt, 4-acryloylmorpholine, poly(ethylene glycol), and methyl ether acrylate.

2. The cement slurry of claim 1, in which the cement slurry comprises from 0.05 to 10 wt. % of the branched star polymer.

3. The cement slurry of claim 1, in which the hydrophilic branched star polymer has a molecular weight of greater than 3000 g/mol.

4. The cement slurry of claim 1, in which crosslinker C comprises vinyl aromatic, N,N-methylenebisacrylamide, bis (2-methacryloyl)oxyethyl disulfide, 1,4-bis(4-vinylphenoxy)butane, divinyl benzene, ethylene glycol dimethacrylate, diethylene glycol dimethacrylate, tetra(ethylene glycol) diacrylate, triethylene glycol dimethacrylate, poly(ethylene glycol) dimethacrylate, neopentyl glycol diacrylate, neopentyl glycol propoxylate diacrylate, tri(propylene glycol) diacrylate, or combinations thereof.

5. The cement slurry of claim 1, in which monomer A is acrylic acid, monomer B is N,N-dimethylacrylamide, monomer D is 2-acrylamido-2-methylpropane sulfonic acid, and crosslinker C is N,N-methylene bis(acrylamide).

6. The cement slurry of claim 1, in which:
the hydrophilic branched star polymer comprises from 5 to 75 wt. % of monomer A;
the hydrophilic branched star polymer comprises from 15 to 50 wt. % of monomer B;
the hydrophilic branched star polymer comprises from 15 to 30 wt. % of crosslinker C; and
the hydrophilic branched star polymer optionally comprises from 15 to 50 wt. % of monomer D.

7. The cement slurry of claim 1, in which the aqueous phase comprises fresh water, salt water, brine, municipal water, formation water, produced water, well water, filtered water, distilled water, sea water, or combinations thereof.

8. The cement slurry of claim 1, in which the cement precursor material comprises one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, calcium aluminate, and combinations thereof.

9. The cement slurry of claim 1, further comprising one or more additives selected from the group consisting of accelerators, retarders, extenders, weighting agents, fluid loss control agents, lost circulation control agents, viscosifiers, dispersants, pH buffers, electrolytes, glycols, glycerols, dispersion aids, corrosion inhibitors, foamers or defoamers, starches, xanthan gum polymers, or surfactants.

10. The cement slurry of claim 1, in which the cement slurry comprises from 10 wt. % to 70 wt. % of the aqueous phase based on a total weight of the cement slurry.

\* \* \* \* \*